(12) United States Patent
Frakes et al.

(10) Patent No.: US 7,831,088 B2
(45) Date of Patent: Nov. 9, 2010

(54) DATA RECONSTRUCTION USING DIRECTIONAL INTERPOLATION TECHNIQUES

(75) Inventors: David Harold Frakes, Atlanta, GA (US); Joseph Wilson Monaco, Atlanta, GA (US); Mark J. T. Smith, West LaFayette, IN (US); Ajit P. Yoganathan, Tucker, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 851 days.

(21) Appl. No.: 10/865,084

(22) Filed: Jun. 10, 2004

(65) Prior Publication Data

US 2005/0041842 A1 Feb. 24, 2005

Related U.S. Application Data

(60) Provisional application No. 60/478,547, filed on Jun. 13, 2003, provisional application No. 60/478,665, filed on Jun. 13, 2003.

(51) Int. Cl.
*G06K 9/00* (2006.01)
(52) U.S. Cl. ..................................... 382/154
(58) Field of Classification Search ................. 382/154, 382/199, 285, 266, 173, 300; 345/653–654, 345/664–665, 679–680, 626
See application file for complete search history.

(56) References Cited

U.S. PATENT DOCUMENTS

| | | | | |
|---|---|---|---|---|
| 5,930,378 A | * | 7/1999 | Kubota et al. | 382/107 |
| 6,466,684 B1 | * | 10/2002 | Sasaki et al. | 382/104 |
| 6,654,483 B1 | * | 11/2003 | Bradski | 382/107 |
| 6,757,423 B1 | * | 6/2004 | Amini | 382/154 |
| 6,788,802 B2 | * | 9/2004 | Chiba et al. | 382/107 |
| 2002/0171759 A1 | * | 11/2002 | Handjojo et al. | 348/452 |
| 2003/0076406 A1 | * | 4/2003 | Peleg et al. | 348/36 |

OTHER PUBLICATIONS

Tong-Yee Lee et al. "Morphology-based three-dimensional interpolation", I.E.E.E. Transactions on Medical Imaging, vol. 19, No. 7, Jul. 2000.*

W. e. Higgins et al. "Shape-Based Interpolation of Tree-Like Structures in Three-Dimensional Images", I.E.E.E. Transactions on Medical Imagin, vol. 12, No. 3, Sep. 1993.*

Francois G. Meyer et al. "Tracking Myocardial Deformation Using Phase Contrast MR Velocity Fields: A Stochastic Approach", I.E.E.E. Transactions on Medical Imagin, vol. 15, No. 4, Aug. 1996.*

(Continued)

*Primary Examiner*—Brian Q Le
(74) *Attorney, Agent, or Firm*—Thomas, Kayden, Horstemeyer & Risley, LLP

(57) ABSTRACT

Approaches to three-dimensional (3D) data reconstruction are presented. The 3D data comprises 2D images. In some embodiments, the 2D images are directionally interpolated to generate directionally-interpolated 3D data. The directionally-interpolated 3D data are then segmented to generate segmented directionally-interpolated 3D data. The segmented directionally-interpolated 3D data is then meshed. In other embodiments, a 3D data set, which includes 2D flow images, is accessed. The accessed 2D flow images are then directionally interpolated to generate 2D intermediate flow images.

10 Claims, 13 Drawing Sheets

OTHER PUBLICATIONS

Timothy M. Healy et al. "Noninvasive Fluid Dynamic Power Loss Assessments for Total Cavopulmonary Connections Using the Viscous Dissipation Function: A Feasibility Study", Journal of Biomechanical Engineering ASME, vol. 123, Aug. 2001.*

Ivan Vesely et al. "Automated 3-D Reconstruction of Vascular Structures from High Definition Casts", I.E.E.E. Transactions on Biomedical Engineering, vol. 38, No. 11, Nov. 1991.*

Frakes, et al. "Application of an adaptive control grid interpolation technique to morphological vascular reconstruction", I.E.E.E. Transactions on Biomedical Engineering vol. 50, No. 2, Feb. 2003.*

Frakes, et al. "Application of an adaptive control grid interpolation technique to MR data set augmentation aimed at morphological vascular reconstruction", Proceedings of SPIE vol. 4684, 2002.*

Wikipedia "Computational Fluid dynamics". http://en.wikipedia.org/wiki.*

Frakes, D., Monaco, J., Smith, M., Fogel, M. Parks, J., Yoganathan, A.; "Clinical Implementation of a Surgical Planning Tool;" The Journal of Cardiovascular Magnetic Resonance, Feb. 2003; pp. 1-22.

Frakes, D., Smith M.J.T., Yoganathan, A.; "Three-Dimisional Velocity Field Reconstruction"; The ASME Journal of Biomedical Engineering, Sep. 2003; pp. 1-42.

Frakes, D., Conrad, C., Healy, T., Monaco, J. Smith, M, Fogel, M., Sharma, S., Yoganathan, A.; "Application of an Adaptive Control Grid Interpolation Technique to Morphological Vascular Reconstruction"; IEEE Transactions on Biomedical Engineering, Mar. 2003; pp. 1-9.

Frakes, D., Kitajima, H., Pekkan, K., Yoganathan, A.; "MRI Velocity Data Reconstruction for Power Loss Estimation"; Internation Society for Magnetic Resonance in Medicine 12th Scientific Meeting and Exhibition, Apr. 2004; pp. 1.

Frakes, D., Fogel, M., Parks, J., Sharma, S., Smith, M.J.T., Yoganathan, A.; "MRI-Based 3D Modeling of Cardiac Vascular Anatomies for Surgical Applications;" American College of Cardiology Annual Scientific Session 2004, Mar. 2004; pp. 1.

Frakes, D., Sinotte, C., Conrad, C., Healy, T., Fogel, M., Monaco, J., Smith, M., Yoganathan, A.; "Application of an Adaptive Control Grid Interpolation Technique to MR Data Enhancement for Morphological Vascular Reconstruction:" SPIE Medical Imaging Conference 2002; pp. 1-7.

Frakes, D., Conrad, C., Healy, T., Monaco, J., Smith, M., Yoganathan, A.; "Application of an Adaptive Control Grid Interpolation Technique to Morphological Vascular Reconstruction: A Component of a Comprehensive Surgical Planning and Evaluation Tool;" $23^{rd}$ Annual International Conference of the IEEE-EMBS; 2001; pp. 1-4.

Frakes, D., Conrad, C., Healy, T., Monaco, J., Smith, M., Yoganathan, A.; "An Integration of Adaptive Control Grid Interpolation-Based MR Reconstruction and CFD Analysis Aimed at Surgical Planning:" Fifth International Symposium on Computer Methods in Biomechanics and Biomedical Engineering; 2001; pp. 1.

Frakes, D., Conrad, C., Healy, T., Monaco, J., Smith, M., Fogel, M., Sharma, S., Yoganathan, A.; "Application of an Adaptive Control Grid Interpolation Technique to MR Data Set Augmentation Aimed at Morphological Vascular Reconstruction;" ISMRM Minimum Data Acquisition Workshop; 2001; pp. 1-4.

Frakes, D., Healy, T., Sharma, S., Monaco, J, Smith, M., Yoganathan, A.; "Application of an Adaptive Control Grid Interpolation Technique to Total Cavopulmonary Connection Blood Flow Image Reconstruction;" ASME Bioengineering Conference; 2001; pp. 1-2.

Frakes, D., Monaco, J, Smith, M.; "Suppression of Atmospheric Turbulence in Video Using an Adaptive Control Grid Interpolation Approach;" International Conference on Acoustics, Speech, and Signal Processing; 2001; pp. 1-4.

Frakes, D., Sinotte, C., Sharma, S., Parks, J., Fogel, M., Smith, M., Yoganathan, A.; "A Technique for the Reconstruction of Three-Dimensional Flow Fields from Phase Encoded MR Velocity Images;" 2003 Summer Bioengineering Conference; Jun. 2003; pp. 1-2.

Frakes D., Healy T., Sharma S., Monaco J., Smith M., Yoganathan A. Application of an Adaptive Control Grid Interpolation Technique to Total Cavopulmonary Connection Blood Flow Image Reconstruction. ASME Summer Bioengineering Conference. Snowbird, UT. 2001.

* cited by examiner

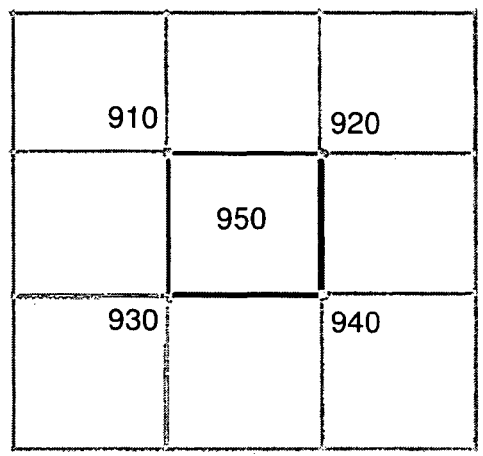
FIG. 9
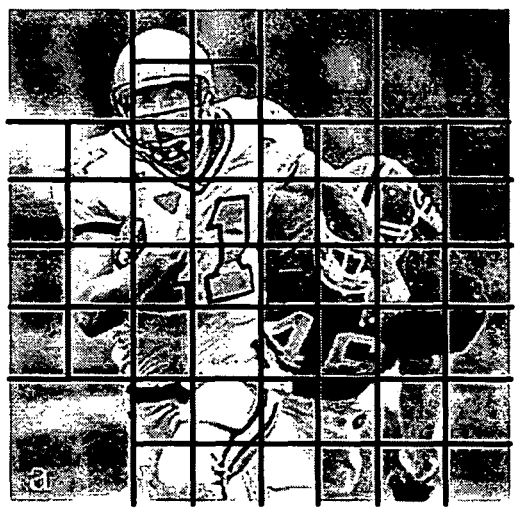  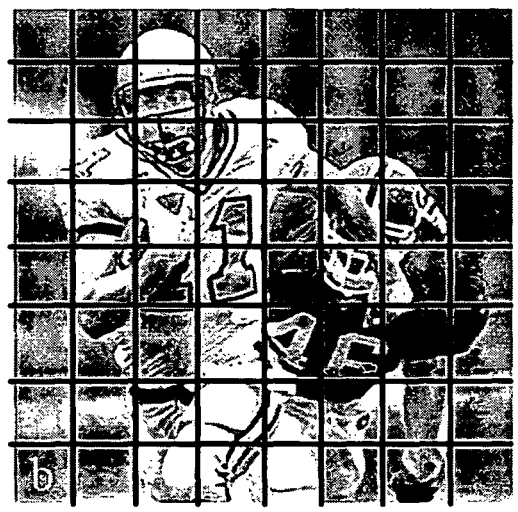
FIG. 10A     FIG. 10B

DATA RECONSTRUCTION USING DIRECTIONAL INTERPOLATION TECHNIQUES

CROSS REFERENCE TO RELATED APPLICATIONS

This application claims the benefit of U.S. provisional patent application Ser. Nos. 60/478,547 and 60/478,665, both filed on Jun. 13, 2003, which are incorporated herein by reference as if set forth in their entireties.

The following document is also incorporated herein by reference, as if set forth in its entirety: Frakes, D. H., "An Adaptive Control Grid Interpolation Technique for the Three-Dimensional Reconstruction of MRI Data," Ph.D. Thesis, Georgia Institute of Technology, October 2003, referred to hereinafter as "the Frakes thesis."

STATEMENT REGARDING FEDERALLY-SPONSORED RESEARCH OR DEVELOPMENT

The U.S. government has a paid-up license in this invention and the right in limited circumstances to require the patent owner to license others on reasonable terms as provided for by the terms of contract number R01-HL-67622 awarded by the National Institutes of Health (NIH), a part of the U.S. Department of Health and Human Resources.

FIELD OF THE INVENTION

The present disclosure relates generally to data reconstruction and, more particularly, to data reconstruction using directional interpolation techniques.

BACKGROUND

Data reconstruction is an important issue in a variety of applications. For example, such as in medical imaging applications, raw data is often acquired over a three-dimensional (3D) anatomical space. Using magnetic resonance (MR) imaging, in particular, 3D data is often acquired as a sequence of 2D images obtained as contiguous slices. The 3D image is reconstructed by concatenating the contiguous 2D slice images.

Often, the resolution of the data in one or more dimensions of the 3D data set is not comparable to the resolution in the remaining dimensions. For example, in medical imaging, such as in MR imaging, the in-plane resolution of the 2D MR image may be much finer than the slice resolution. In other words, the pixel dimensions within the MR image plane may be much finer than the slice thickness that extends normal to the MR image plane. For simplicity, the dimension having a coarser resolution is referred to herein as the "deficient dimension," while the other dimensions are referred to herein as "non-deficient dimensions."

Given the mismatch in resolution, it is desirable to increase the resolution in the deficient dimension to match the resolution in the non-deficient dimensions. Thus, various interpolation techniques have been developed to enhance the resolution in the deficient dimension.

Unfortunately, there is still much room for improvement in known interpolation techniques.

SUMMARY

Approaches to three-dimensional (3D) data reconstruction are presented. The 3D data comprises 2D images. In some embodiments, the 2D images are directionally interpolated to generate directionally-interpolated 3D data. The 2D images comprising the directionally-interpolated 3D data are then segmented to generate segmented 3D data. The directionally-interpolated and segmented 3D data is then meshed. In other embodiments, the 3D data set, which includes 2D flow images, is accessed. The accessed 2D flow images are then directionally interpolated to generate 2D intermediate flow images.

Other systems, devices, methods, features, and advantages will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 9 is a diagram illustrating control points for which weighted square errors (WSE) are successively minimized.

FIG. 10A is a diagram illustrating quadtree subdivision resulting from adaptive subdivision algorithms.

FIG. 10B is a diagram illustrating quadtree subdivision resulting from uniform subdivision algorithms.

DETAILED DESCRIPTION OF THE EMBODIMENTS

Figure 1A:
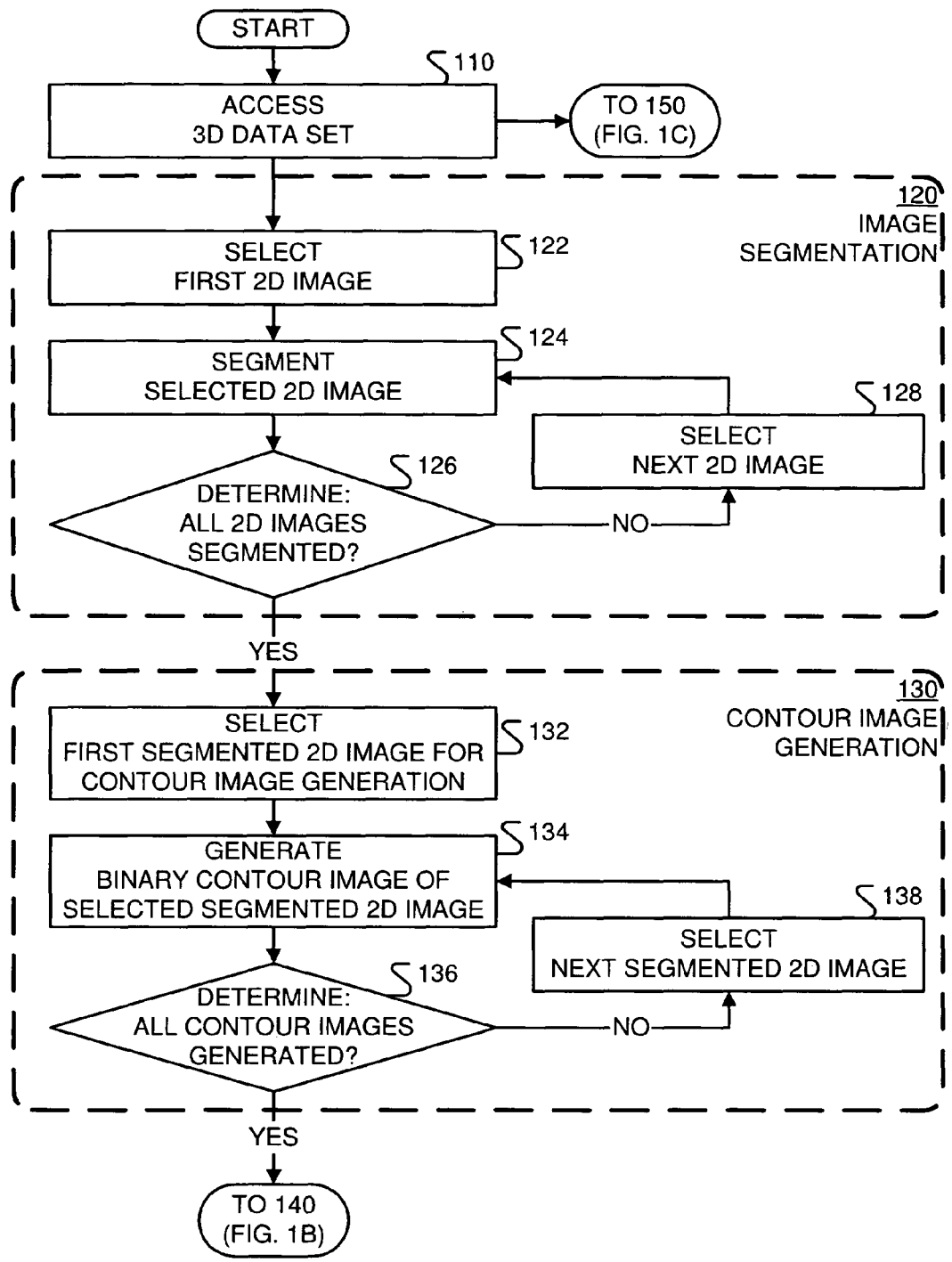
FIGS. 1A through 1E are flowcharts illustrating one embodiment, among others, of a process for directional interpolation of a three-dimensional (3D) data set.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents.

As noted above, various interpolation techniques have been previously proposed. However, each of those interpolation techniques suffers from various drawbacks. The disclosed systems and methods provide alternative approaches that remedy the various drawbacks existent in those previously-proposed techniques.

Figure 1B:
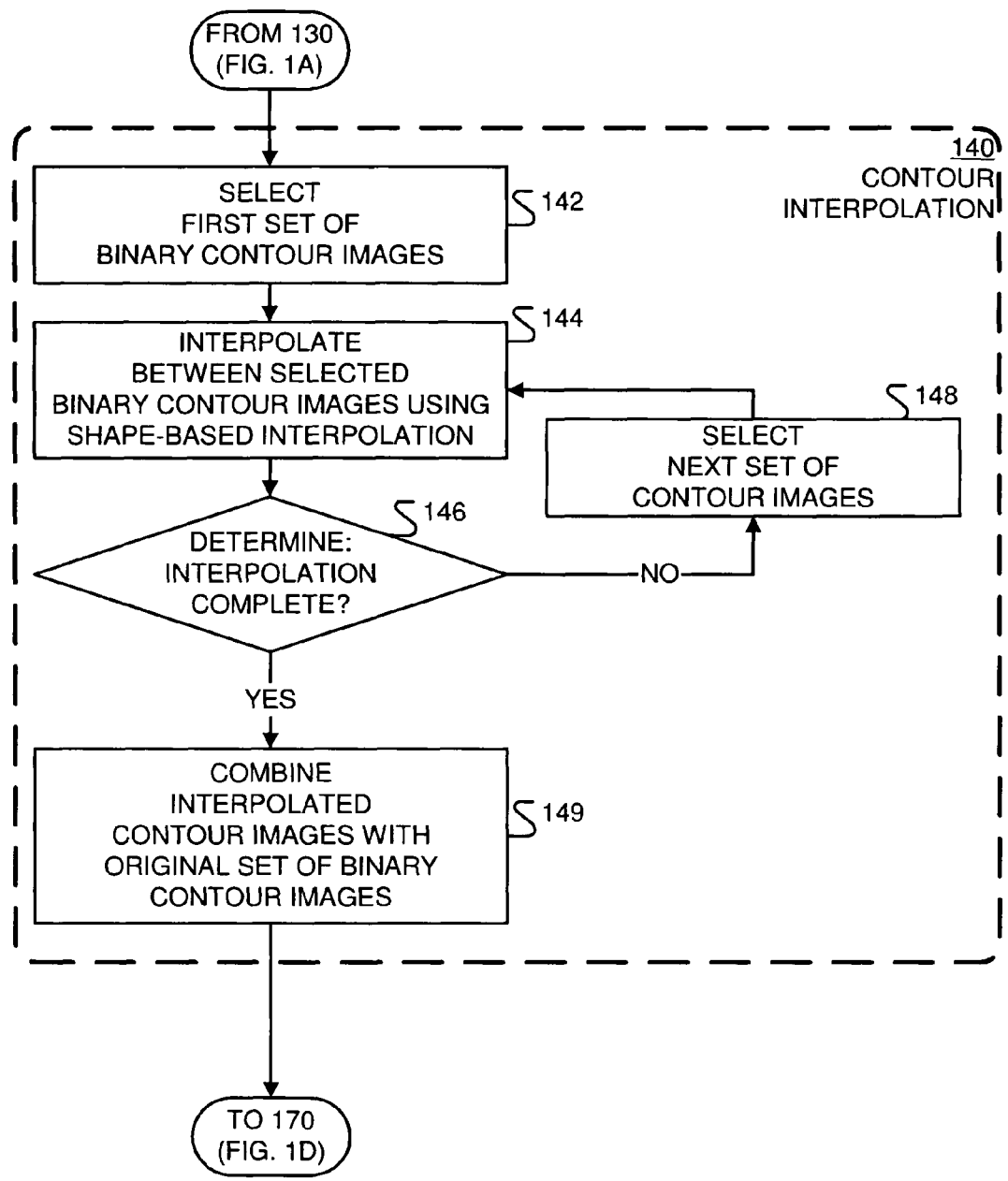
Figure 1C:
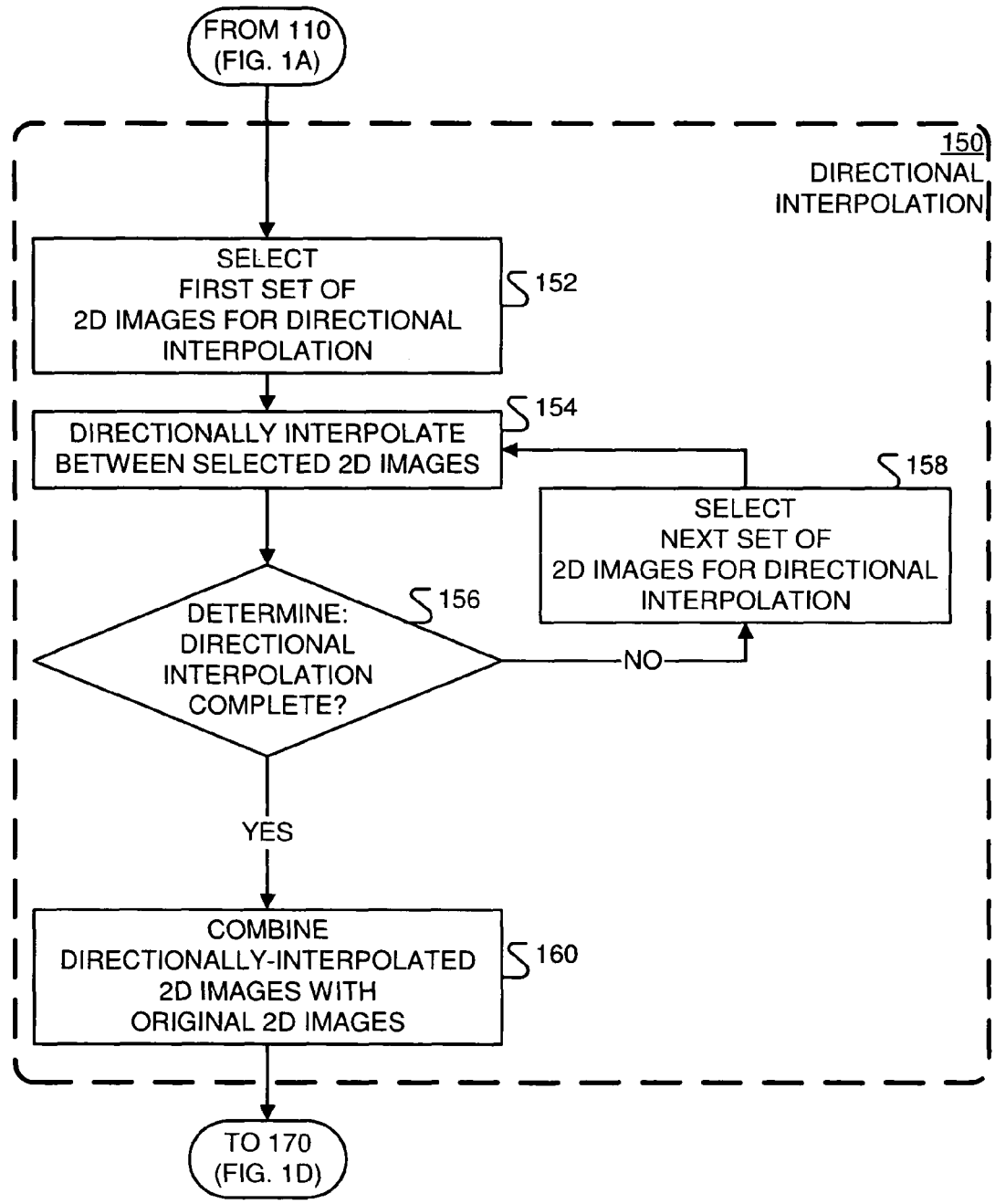

Some embodiments provide approaches for performing directional interpolation on various three-dimensional (3D) data sets. These 3D data sets can include morphological data, velocity data (e.g., magnetic resonance (MR) imaging velocity data), sequential video frames, etc. FIGS. 1A through 1C show one embodiment, among others, of a method for performing directional interpolation on such 3D data sets.

As shown in FIG. 1A, the method begins by accessing (110) a 3D data set, which is comprised of multiple 2D images. Upon accessing (110) the 3D data set, in some embodiments, the method branches to two separate processes. The results of these two processes are later combined.

In the first process, which continues in FIG. 1A, each of the 2D images in the 3D data set is segmented (120). Preferably, the 2D images are automatically segmented using, for example, a rolling ball algorithm, such as that described in the Frakes thesis. Contour images are then generated (130) from each of the segmented (120) images. In that regard, each contour image corresponds to one of the segmented (120) images from the 3D data set. For simplicity, the contour images are preferably binary images, in which a desired region of interest (ROI) is designated with a binary "1," while an undesired region is designated with a binary "0."

Continuing in FIG. 1B, once the contour images are generated (130), the contour images are interpolated (140) to generate intermediate contour images. Since the contour images are used as masks in subsequent steps, the interpolation of the contour images need not be as precise as the interpolation of the actual 2D images from the 3D data set. In that regard, in some embodiments, among others, a shape-based interpolation can be implemented to interpolate (140) between the two binary contour images.

Upon completion of contour interpolation (140), the resulting contour interpolated images are combined (149) with the original set of binary contour images, which were previously selected (142). Given the result of the contour interpolation (140), the first process continues to FIG. 1D.

Figure 1D:
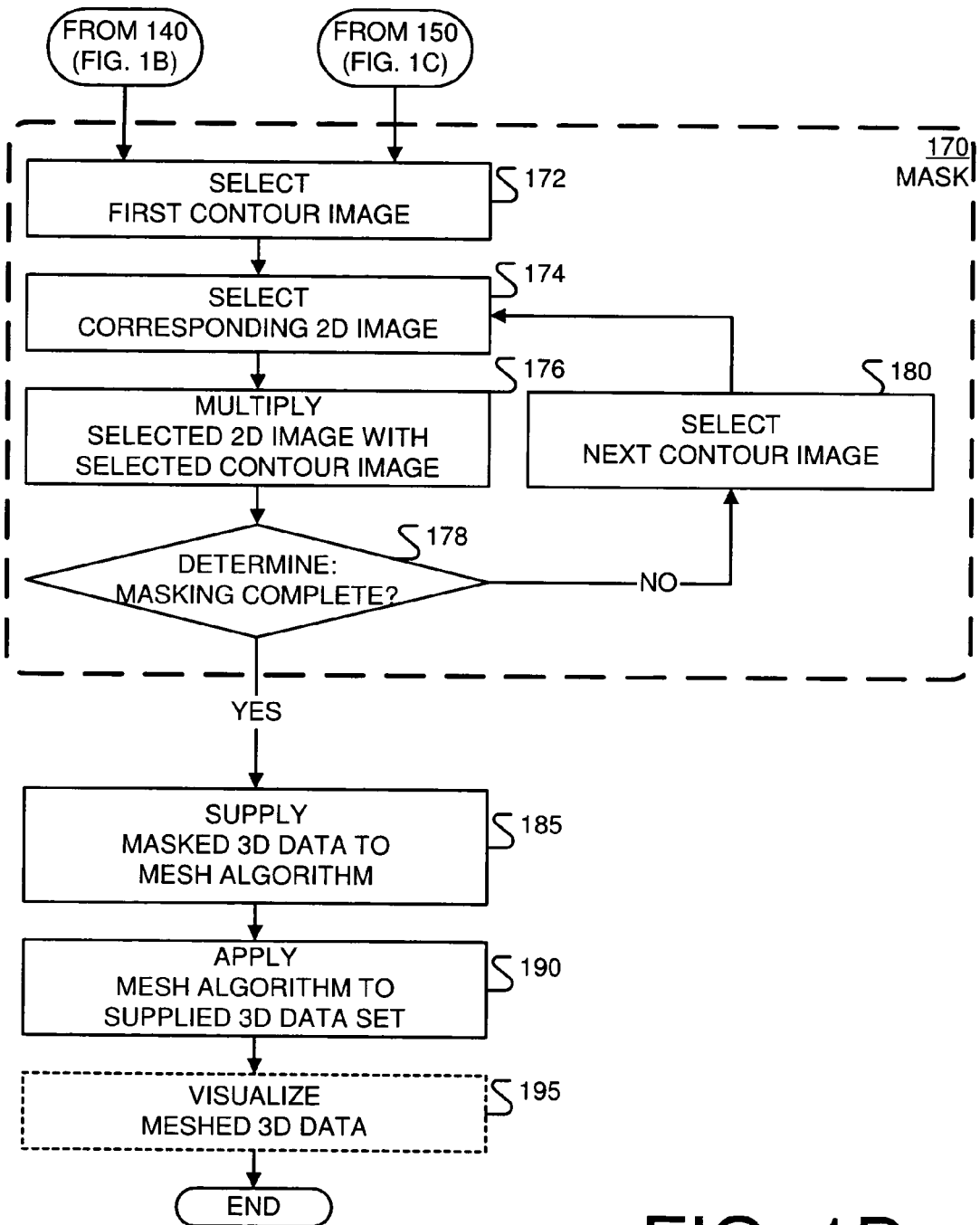

In the second process, which is shown in FIG. 1D, the 2D images from the 3D data set are directionally interpolated (150). For some embodiments, the directional interpolation (150) can be performed using a block-based motion estimation algorithm. In other embodiments, the directional interpolation (150) can be performed using an optical flow-based motion estimation algorithm. Preferably, however, the directional interpolation (150) is performed using either a control grid interpolation (CGI) or an adaptive control grid interpolation (ACGI) approach, such as those described below.

The directionally interpolated (150) 2D images are combined (160) with the original 2D images to generate a 3D volumetric image. Specifically, for velocity images, each of the three orthogonal directions (e.g., x-direction, y-direction, and z-direction) of the velocity data are combined during this step. Upon completion of the directional interpolation (150), the second process also continues to FIG. 1D.

As shown in FIG. 1D, both the contour interpolation (140) and the directional interpolation (150) processes combine to the masking (170) step. The masked (170) data is then supplied (185) to a mesh algorithm, and the application (190) of the mesh algorithm generates a 3D meshed volume. Since meshing techniques are known in the art, further discussion of such processes is omitted here. Upon meshing (190), the meshed 3D data can, optionally, be visualized.

The process of directionally interpolating the 2D images produces markedly improved 3D data, as noted in the Frakes thesis and, also, in U.S. provisional patent application Ser. Nos. 60/478,547 and 60/478,665, which are incorporated herein by reference as if set forth in their entireties. Additionally, the segmenting of the data prior to interpolation results in improved computational time, since fewer images are segmented prior to the directional interpolation. Moreover, the segmentation prior to interpolation results in a lesser probability of segmentation error, since fewer images are segmented.

For some embodiments, the image segmentation (120) step can be seen as a multi-step process. For example, as shown in FIG. 1A, in one embodiment, among others, the image segmentation step (120) includes the selection (122) of each 2D image, and a segmentation (124) of each of the selected 2D images. Preferably, the segmentation is performed automatically using, for example, a rolling ball approach, such as that described in greater detail in the Frakes thesis. The image segmentation step (120) ends when all of the 2D images have been segmented.

The contour-image generation step (130) can also be seen, in some embodiments, as a multi-step process, such as that shown in FIGS. 1A and 1B. Thus, in one embodiment, a contour image is generated from each 2D image by selecting (132) a segmented image, and generating (134) a binary image from the selected segmented image. Subsequent segmented images are selected (138) for binary contour image generation (134), until contour images have been generated for all segmented images.

The contour interpolation step (140) of FIG. 1B, likewise, can be seen as a multi-step process, which includes the steps of selecting (142) two contour images, and interpolating (144) between the selected contour images to generate intermediate contour images. Subsequent contour images are selected (148) and interpolated (144) until intermediate contour images have been generated from all contour images. As noted above, since the interpolation of the contour images need not be as precise as the interpolation of the 2D images from the 3D data set, conventional shape-based interpolation techniques can be employed for the contour interpolation step (140). Since such shape-based interpolation techniques are known in the art, and, also, since such techniques are discussed in the Frakes thesis, further discussion of such techniques is omitted here.

The directional interpolation step (150), in the second process branch of FIG. 1C, can also be viewed as a multi-step process, including the steps of selecting (152) a first set of 2D images, and directionally interpolating (154) between the selected 2D images to generate a directionally-interpolated intermediate 2D images. The selected 2D images are adjacent images. Hence, the generated intermediate 2D images are located between the two adjacent selected 2D images. Subsequent 2D images are selected (158) for directional interpolation (154) until all intermediate 2D images have been generated from the 3D data set. In other words, the directional interpolation (150) step results in directionally-interpolated 3D data.

For some embodiments, in which the contour masks are binary masks, the masking step (170) can be seen as a simple multiplication of the segmented images with the generated masks. Since the masks are binary masks, the multiplication of the masks with the segmented images results in a preservation of all pixels/voxels that are multiplied by "1," and a removal of all pixels/voxels that are multiplied by "0." Since this and other masking techniques are known in the art, further discussion of masking techniques is omitted here.

Figure 1E:
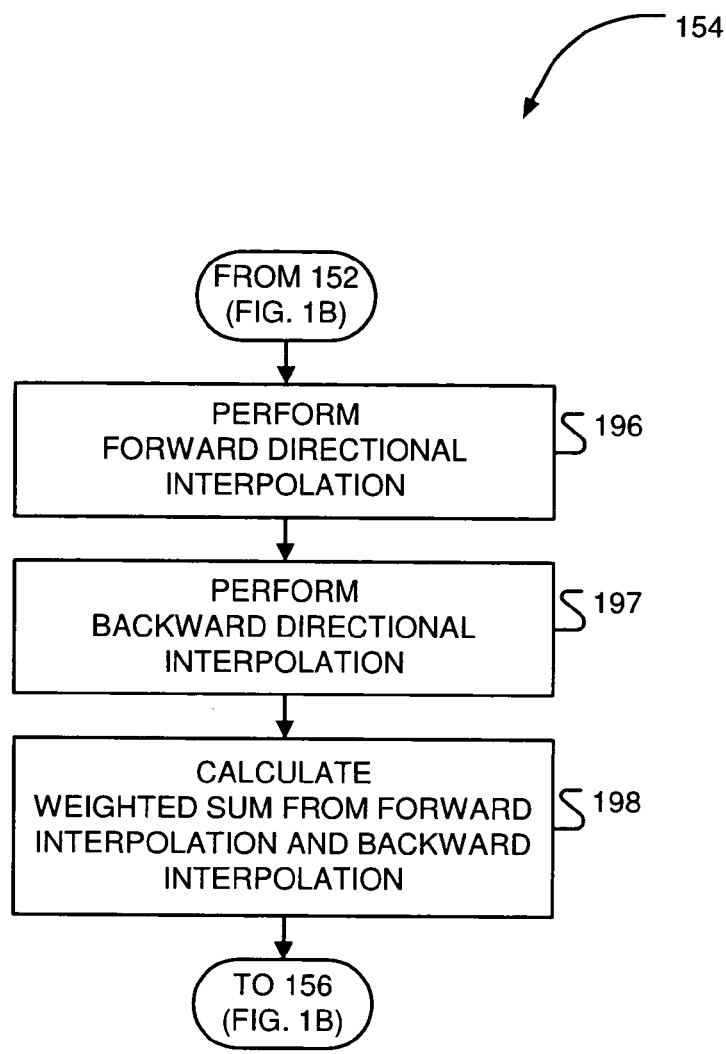

FIG. 1E shows, in greater detail, an embodiment of the directional interpolation (154) step of FIG. 1C. As shown in FIG. 1E, some embodiments, among others, of the directional interpolation (154) step include the step of performing (196) a forward directional interpolation between two selected images (e.g., image A and image B). Additionally, the directional interpolation (154) step, for that embodiment, includes the step of performing (197) a backward directional interpolation between the two selected images. The forward directional interpolation (196) can be seen as a directional interpolation from image A to image B, while the backward directional interpolation (197) can be seen as a directional interpolation from image B to image A. In other words, the two selected images are interpolated in both directions. The reason for performing the bi-directional interpolation is because, typically, the results from the two directional interpolations (196, 197) are not the same. Upon performing both the forward and backward directional interpolation (196, 197), a weighted sum is calculated (198) from both of the results. That weighted sum is selected as the interpolated 2D image. The weighted sum is advantageous because it takes into account the results from both the directional interpolations. Further details of the process for calculating the weighted sum are described below.

Figure 2:
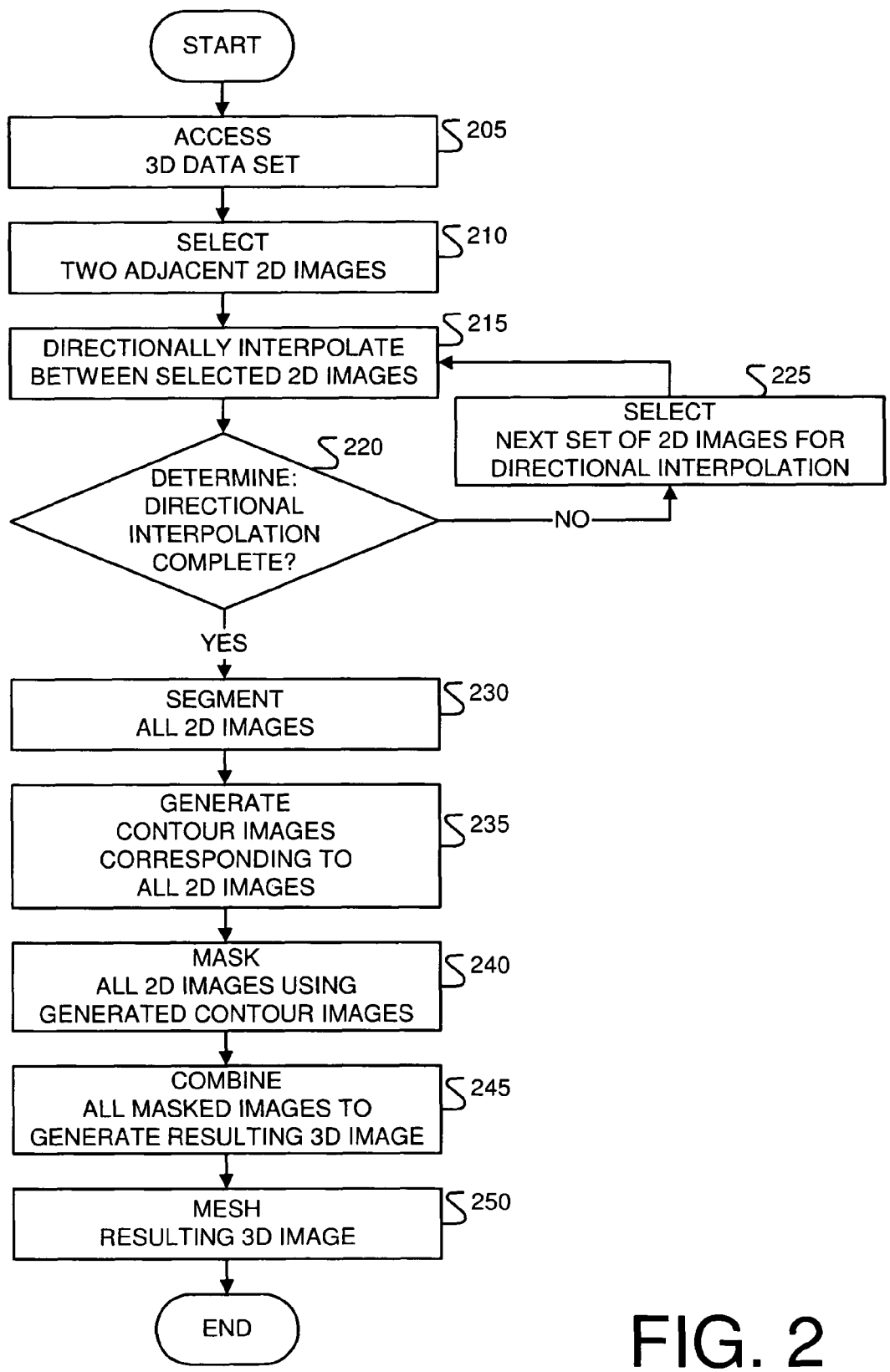
FIG. 2 is a flowchart illustrating another embodiment, among others, of a process for directional interpolation of a 3D data set.

While the method of FIGS. 1A through 1D show two parallel processes, it should be appreciated that, for other embodiments, the two processes can be performed sequentially. For example, the directional interpolation step (150) and the segmentation step (120) can be switched. Such an embodiment, among others, is shown in FIG. 2. As shown in FIG. 2, a 3D data set is accessed (205). From that 3D data set, two adjacent 2D images are selected (210). Thereafter, a directional interpolation (215) is performed between the two selected 2D images to generate one or more intermediate images. As noted above, the directional interpolation (215) can include an execution of a block-based motion estimation algorithm or an optical flow-based motion estimation algorithm, both of which are known in the art. Alternatively, the directional interpolation (215) can include CGI or ACGI approaches, such as those discussed in the Frakes thesis and U.S. provisional patent application Ser. Nos. 60/478,547 and 60/478,665.

As shown in FIG. 2, the process determines whether directional interpolation (215) has been performed on all images. If the directional interpolation has not been completed for all images, then the process selects (225) the next set of two adjacent images, and directionally interpolates (215) between those images. Once the directional interpolation (215) has been completed on all images, the process segments all of the 2D images. In other words, the original 2D images are segmented, and, also, the intermediate 2D images are segmented. Preferably, these images are automatically segmented, rather than manually segmenting each image.

The process continues by generating (235) contour images. Each of the contour images corresponds to one of the segmented images. Thus, each segmented image has a corresponding contour image. The contour images are then used to mask (240) their corresponding segmented 2D images.

In some embodiments, the masked images are then combined (245) to generate a resulting 3D image, which is then meshed (250) in accordance with known techniques.

One advantage of performing the directional interpolation prior to segementation is that segmentation errors are isolated and do not propagate to other slices. To the contrary, if the raw images are segmented before interpolation and the segmented images are used to interpolate, then any error in segmentation will propagate to the intermediate images that are generated from the incorrectly-segmented images.

Having generally described several embodiments for performing directional interpolation on 3D data sets, the specifics of such processes are discussed in greater detail below.

As noted above, there has been a well-established need for estimating motion from frame to frame in video sequences. Usually this need has applied to the common case where an object is moving within the scene captured by a video sequence. More recently alternative scenarios have evolved, in which the concept of motion is less intuitive, but where the computed motion vector field remains useful. Motion estimation as a precursor to interpolation for data reconstruction is one such case.

Two similar perspectives on motion characterization often arise in the motion estimation context. The first, referred to here as image flow, is the projection of three-dimensional velocities onto the two-dimensional observation plane. Image flow is the desired result of motion estimation algorithms. Unfortunately, direct determination of true three-dimensional image flow from video often requires additional information that is unavailable in most cases. Accordingly the notion of optical flow, the second commonly referenced motion perspective, is convenient for motion to be estimated with the available information.

Figure 3:
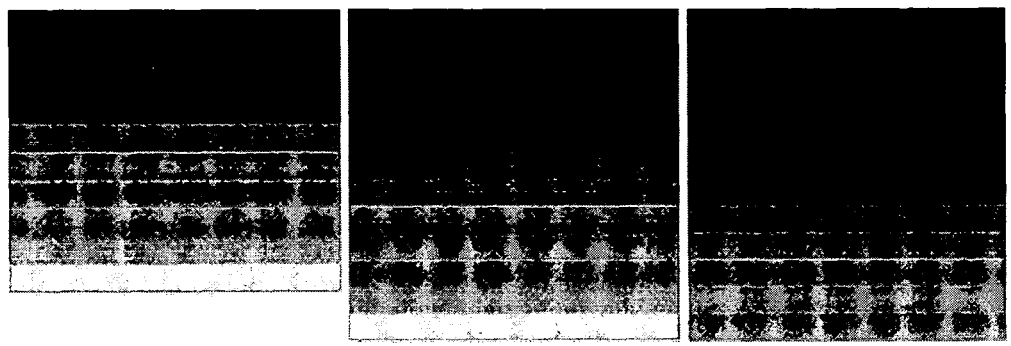
FIG. 3 is a diagram illustrating apparent motion of brightness gradient due to linear illumination change.

More specifically, optical flow refers to the apparent motion of brightness patterns in an image sequence. To underscore the difference between the two referenced perspectives of motion, the example of illumination change is useful. When the illumination of a scene alone changes, there are noticeable differences in the image sequence. These changes are clearly not due to any true motion of objects within the scene. However, when only two-dimensional images displaying an illumination change are available, the variation can be indistinguishable from real motion both visually and from a mathematical standpoint. Consider the example displayed in FIG. 3, in which apparent motion of the brightness gradient downward is due only to a linear variation in the illumination. As shown in FIG. 3, as the intensity of the frame is darkened (from left to right), it appears that the grayscale is moving downward.

The origin of the apparent motion is known in this case, but such information is not always available. Accordingly, the variation present in FIG. 3 could be described as either an intensity change or motion. Unless otherwise indicated in this disclosure, references to motion are viewed in terms of optical flow.

The intensity of a digitized image can be expressed in terms of spatial locations and time by the expression $I[n_1,n_2,k]$ where the vector $(n_1,n_2)$ describes a spatial location within the image matrix and the variable k represents the time index corresponding to a specific frame within an image sequence. For simplicity, the brightness constraint is assumed to hold throughout an image sequence. This means that the luminance of each point is assumed to remain fixed as it undergoes motion. Taking this assumption into consideration, the motion estimation problem is to find the appropriate vector field $(d_1[n_1,n_2,k],d_2[n_1,n_2,k])$ such that:

$$I[n_1,n_2,k]=I(n_1+d_1[n_1,n_2,k],n_2+d_2[n_1,n_2,k],k+\delta k). \quad 1$$

It is noteworthy that the displacement field is not confined to integer values, so that the image at time k+δk is assumed to be continuous.

There are numerous inherent problems associated with trying to determine the appropriate displacement field, one of which is the aperture problem. The aperture problem states that motion cannot be uniquely determined by local observation alone.

Figure 4:
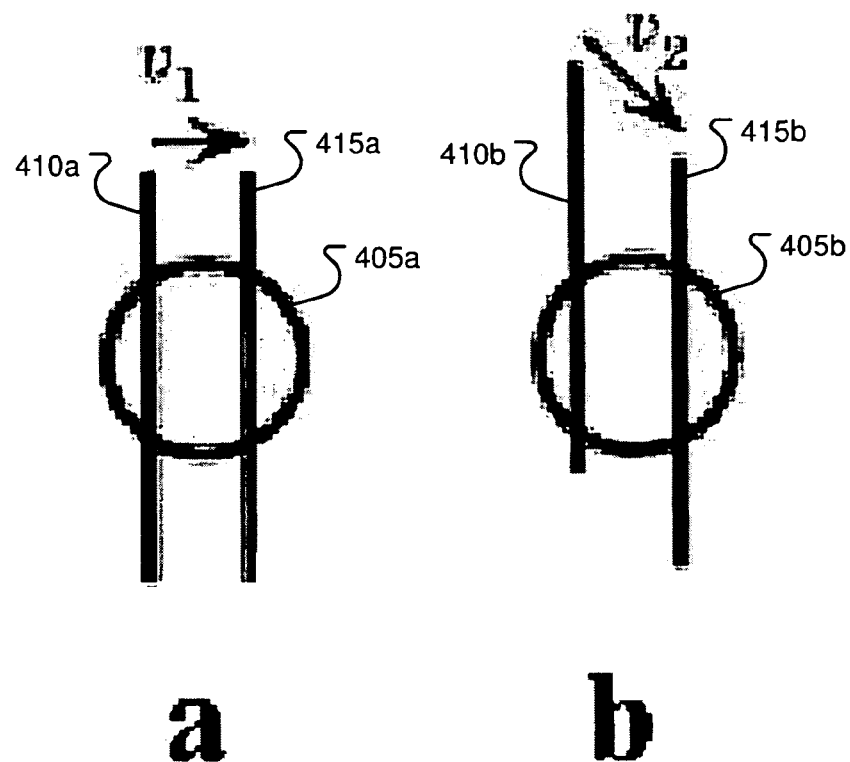
FIG. 4 is a diagram illustrating one example, among others, of an aperture problem.

The aperture problem is demonstrated in FIG. 4, in which a line capable of moving in two dimensions is displayed. The motion of the line is viewed through the aperture 405a indicated by the circular region. This aperture 405 is clearly smaller than the length of the line 410a. When the line motion is viewed through this aperture 405 there is no detectable difference between the motion of a point on the line when the line is moving with velocity $[1\ 0]^T$ or velocity $[1\ 1]^T$. Accordingly, for that case, it is impossible to determine the motion uniquely when the system is viewed through the given aperture 405. As with most problems, an aperture with certain characteristics could be chosen to avoid the problem. Specifically, a larger aperture or one located at the endpoints of the line would allow the determination of a unique motion vector.

The aperture problem is customarily addressed by making assumptions about the motion field and imposing constraints. Structure may be imposed upon the motion field either explicitly by specifying a defined motion model or by applying smoothness constraints to the field of displacement vectors.

Motion estimation strategies are typically distinguished by the motion model used and the estimation process. With respect to the motion model there are two primary categories: pixel-based and block-based strategies. Since both methods are known in the art, only a truncated discussion is provided herein. Both techniques describe the movement of pixels from one image to another, but pixel-based methods assign independent vectors to each pixel while block-based methods assume a constant parametric representation of motion that holds for regions composed of more than one pixel.

Similarly, different estimation processes can be employed. Again block-based and pixel-based techniques characterize different approaches. Block-based models use well-defined parameter search techniques. Alternatively, for optical flow based motion estimation, which is a form of pixel based motion estimation, the optical flow equation is used. Although they both serve to estimate pixel motion, block-based and optical flow-based motion estimation strategies attack the problem differently in terms of both the motion model employed and the estimation procedure.

Block-Based Motion Estimation

Block-based motion estimation routines are normally characterized by two main properties. First, a motion model describing pixel movement is imposed upon each specific block or region of an image. This motion model is typically constrained to the translational case so that only two parameters are estimated for each block. Parameterization of the motion field results in a compact representation of motion.

Figure 5:
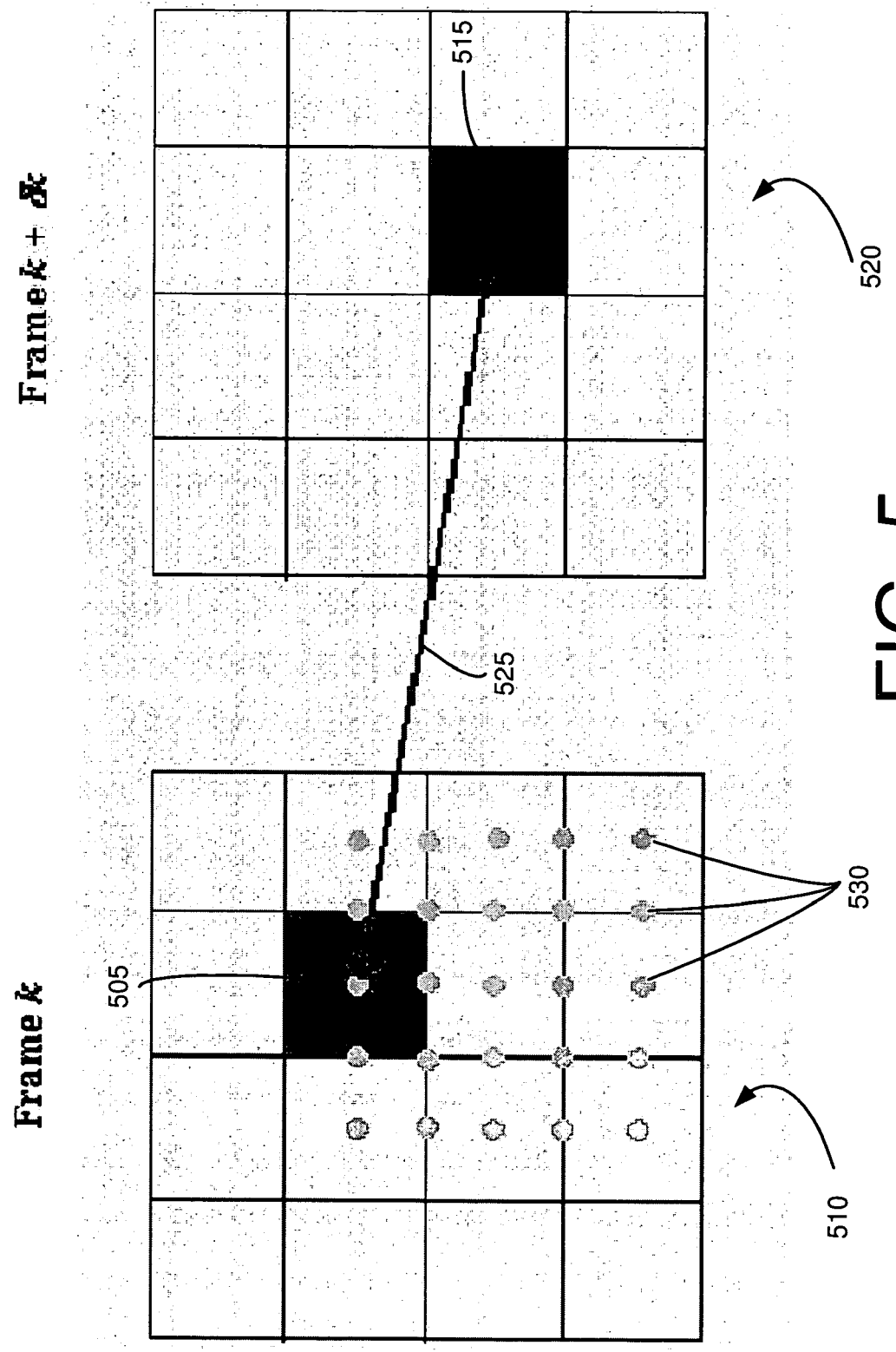
FIG. 5 is a diagram illustrating one example, among others, of a full search block-matching algorithm (FSBMA).

The second characteristic defining block-based strategies is the implementation of a search strategy for determining the optimal model parameters. The simplest case is the full search block matching algorithm (FSBMA). Using this search procedure the optimal motion vector is determined by shifting a block of pixels 505 from an image 510 at time k to all allowable locations 515 in the image 520 at time k+δk. For each possibility, the shift vector 525 is evaluated based on the collective error between the original block of pixels and that found at the shifted location in the next image. The allowable shift corresponding to the minimum error is selected as the optimal motion vector. This process is illustrated graphically in FIG. 5.

The search region size and the resolution of the image are both significant factors in determining the complexity of block matching algorithms (BMAs). The search size is determined by the maximum displacement magnitude that is allowable. This usually corresponds to the range allowed for each individual motion parameter. The resolution in turn determines the quantized step size of sequentially increased parameters. Within that framework, larger search regions and higher resolution correspond to increased computational complexity. Thus, given a fixed complexity constraint, there is a tradeoff between the search region and the degree of displacement resolution. The optimal tradeoff depends on the specific application.

Figure 6:
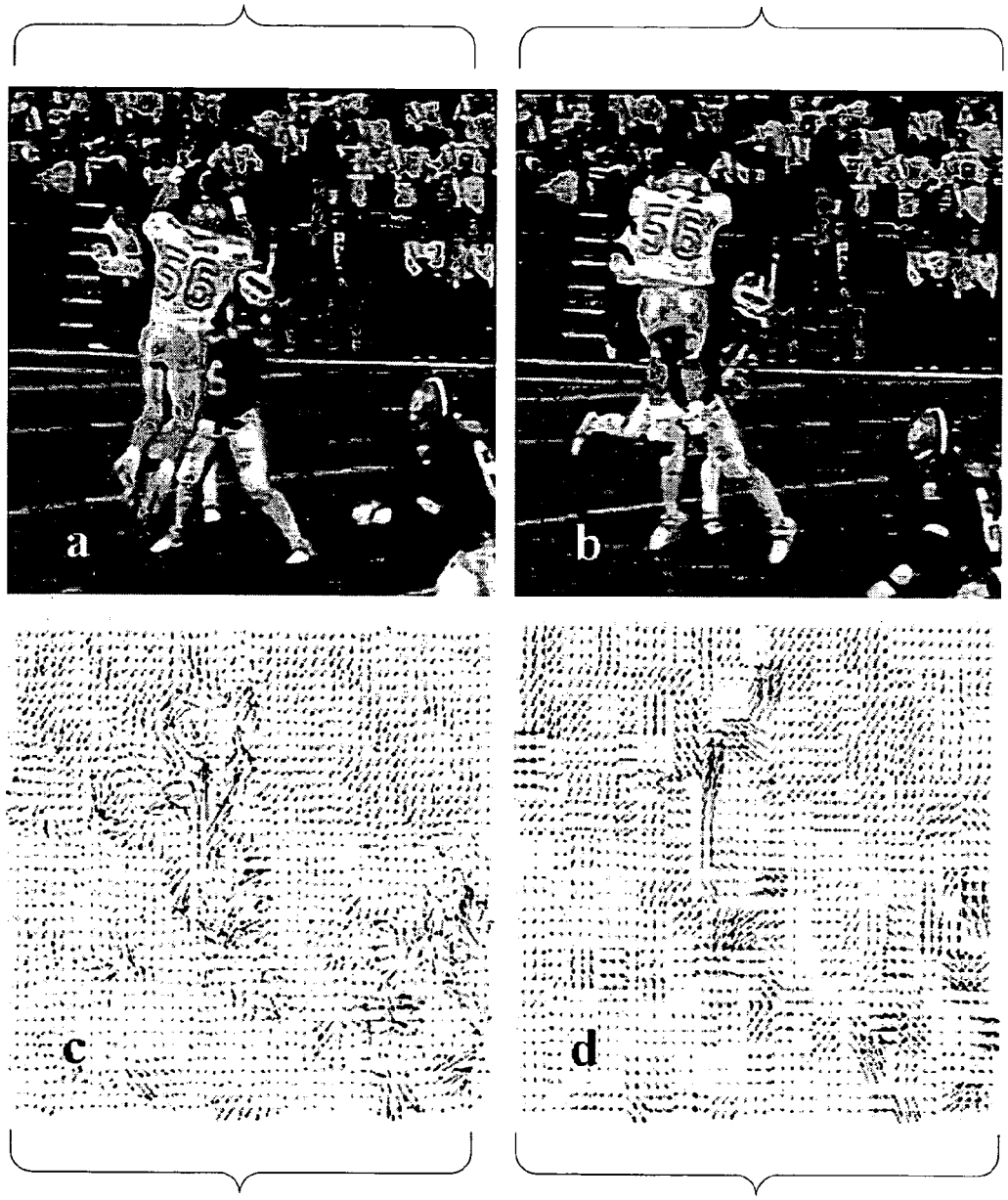
FIG. 6 is a diagram illustrating motion vector fields derived using block matching with different block sizes.

Typical BMAs partition the image at time k into uniform sub-regions of size N×N. Smaller block sizes tend to result in fewer instances where assumptions about the motion field are invalid, but also result in a larger number of fundamentally incorrect motion vectors. This latter drawback is a manifestation of the aperture problem, illumination changes, and image noise. In general, smaller block sizes result in higher resolution motion fields that capture finer characteristics of the true motion, but make the algorithm more likely to produce isolated erroneous motion vectors, or outliers. These facts are illustrated by the respective motion fields 610, 620 in FIG. 6. Specifically, FIG. 6 shows two contiguous frames 605, 615 from a video sequence. The vector field 610 for the first frame 605 was estimated using a 2×2 pixel block, while the vector field 620 for the second frame 615 was estimated using a 16×16 pixel block. In both cases, the motion fields have been downsampled for ease of visualization.

As previously outlined, BMAs determine optimal motion vectors from the set of candidates based on a computed error function. The most commonly used error function is the mean squared error (MSE) given by:

$$\frac{1}{N} \sum_{(n_1,n_2) \in R} (I[n_1, n_2, k] - I[n_1 + d_1, n_2 + d_2, k + \delta k])^2. \qquad 2$$

In real implementation, algorithms are more likely to employ the mean absolute difference (MAD) criterion given by:

$$\frac{1}{N} \sum_{(n_1,n_2) \in R} |(I[n_1, n_2, k] - I[n_1 + d_1, n_2 + d_2, k + \delta k])|. \qquad 3$$

In both cases the 1/N scaling factor is typically omitted in implementation. The MAD error measure performs similarly to the MSE but requires less computation. In compression applications for example, the MSE and MAD yield similar subjective performance results.

BMAs are well suited to handle a variety of common motion scenarios.

To address the noise sensitivity of BMAs, spatial filtering is sometimes applied prior to motion estimation. Such techniques designed to address noise sensitivity are often accompanied by a decrease in computational complexity as well. Simple techniques such as median filtering can be effective. This allows the algorithm to avoid the computation of parameters unrelated to the true motion present in a scene.

Another technique that has worked well in particularly noisy environments is hierarchical motion estimation using the Gaussian pyramid. In that implementation, initial motion estimates are made based on the lowest resolution images in the hierarchy. Then the search procedure continues at successively higher resolution subject to the previous estimation.

Blocks of adaptive size can reduce the number of instances where blocks straddle discontinuous motion regions and/or lessen error associated with complex motion. Adaptive grid structures allow the corners of block regions to move slightly in order to better match sub-regions of the grid to regions of uniform motion within the image.

The concept of image segmentation prior to creation of the BMA grid is also disclosed herein. Segmentation based on intensity information, however, is not guaranteed to create sub-regions corresponding to regions of uniform motion. Segmentation based on regions of uniform motion solves this problem, but requires an initial motion estimation, resulting in a corresponding increase in computational complexity.

Another technique used to increase the flexibility of BMAs is the incorporation of more complex motion models that allow non-translational displacement within each block. Several such options include, among others, affine, bilinear, quadratic, cubic, and others. Since these options are discussed in the Frakes thesis and the provisional patent applications, which are incorporated herein by reference, further discussion of these options is omitted here.

Unfortunately, the use of more robust motion models with BMAs can lead to significantly more complicated estimation. For example, computational complexity associated with the FSBMA is exponentially related to the model order. This makes the full search option largely impractical for higher order models. In practice, most approaches treat the incorporation of higher-order model parameters as only a modest improvement to minimize computation.

Block-based motion models impose an explicitly defined motion model on specific regions within an image and determine the model parameters from the set of allowable solutions for each region based on an error function. Block-based models have traditionally been implemented assuming simple translational motion within each region of support. The block-based approach is effective in many applications, specifically if the block size is kept small. When large block sizes are used, or when more complex motions such as scaling and rotation are present, these models perform poorly.

Optical Flow-Based Motion Estimation

Another approach to accomplishing motion estimation is with pixel-based methodologies. The primary member of this class that will be discussed in the context of this work is optical flow-based motion estimation. In contrast to block-based motion estimation strategies, optical flow-based techniques allow each pixel within an image to travel along a unique motion vector. This fact allows optical flow-based techniques to describe complex non-translational motion well, but prohibits the use of a compact set of motion parameters to describe motion. Two primary components of optical flow-based strategies define the technique. The first is the optical flow equation.

The optical flow equation serves to relate the temporal and spatial derivatives of a point within an image sequence frame to the instantaneous velocity of that point. The equation is derived by considering a point whose location within a given image is given by (x(t),y(t)). Taking the complete derivative of the intensity expression of the image, I(x(t),y(t),t), with respect to time yields, $$\frac{dI(x(t), y(t), t)}{dt} = \frac{\partial I(x(t), y(t), t)}{\partial x} v_x + \frac{\partial I(x(t), y(t), t)}{\partial y} v_y + \frac{\partial I(x(t), y(t), t)}{\partial t}, \qquad 4$$

where $v_x=d(x(t))/dt$ and $v_y=d(y(t))/dt$ respectively are the horizontal and vertical components of the instantaneous velocity. Accordingly Eq. 4 relates the instantaneous velocity of each point to the total change in intensity. This alone is typically insufficient to determine motion, but the assumption that the luminance of each point remains constant as it undergoes motion provides an additional constraint. Explicitly the brightness constraint is described by $$\frac{dI(x^*(t), y^*(t), t)}{dt} = 0, \qquad 5$$

where $(x^*(t), y^*(t))$ describes the true path of each point. Combining the total derivative with the brightness constraint yields the optical flow equation (OFE):

$$\frac{\partial I(x, y, t)}{\partial x} v_x^* + \frac{\partial I(x, y, t)}{\partial y} v_y^* + \frac{\partial I(x, y, t)}{\partial t} = 0. \qquad 6$$

Note the abbreviated expressions x and y in Eq. 6 are synonymous with the expressions x(t) and y(t) listed previously in Eq. 4. This equation is underconstrained and thus does not have a unique solution. Additional constraints are required to determine the appropriate solution uniquely.

Eq. 6 describes a relationship between the instantaneous velocity and partial derivatives at a particular spatio-temporal location within the image sequence.

Alternatively the general expression given in Eq. 1 involves displacement at discrete times k and k+δk. These two equations can be connected using the approximations, $$v_x \approx \frac{d_1(x, y)}{\delta k}, \qquad 7$$

$$v_y \approx \frac{d_2(x, y)}{\delta k}, \qquad 8$$

and, $$\frac{\partial I(x, y, t)}{\partial t} \approx \frac{I(x, y, k) - I(x, y, k + \delta k)}{\delta k}. \qquad 9$$

Substituting these approximate expressions into the optical flow equation yields:

$$\frac{\partial I(x, y, k)}{\partial k} d_1(x, y) + \frac{\partial I(x, y, k)}{\partial k} d_2(x, y) - I(x, y, k + \delta k) + I(x, y, k) = 0. \qquad 10$$

The additional constraints imposed on the motion field in order to solve the OFE are referred to as neighborhood constraints. Specifically, such constraints usually dictate that the motion field must be smoothly varying across an image. These constraints are incorporated into the motion estimation routine via the minimization of an error function. Several popular smoothness constraints, which are known in the art, are listed in the Frakes thesis and the provisional applications. Since those documents are incorporated herein by reference in their entireties, further discussion of smoothness constraints is omitted here.

The determination of image gradients at arbitrary locations in the image is typically required for parameter estimation using the optical flow equation. For simplicity of computation, gradients in reference to the optical flow equation can be approximated by averaging backward and forward differences. This approximation yields the following expressions for image gradients:

$$\frac{\partial(n_1, n_2)}{\partial n_1} = \frac{I(n_1 - 1, n_2) - I(n_1 + 1, n_2)}{2}, \quad 11$$

$$\frac{\partial(n_1, n_2)}{\partial n_2} = \frac{I(n_1, n_2 - 1) - I(n_1, n_2 + 1)}{2}. \quad 12$$

In the context of certain problems there are additional motion estimation techniques that have proven effective. For example, the application of level set methods has been popular in applications aimed at reconstructing three-dimensional morphologies from planar images. It is noteworthy that such methods are not commonly labeled as motion estimation techniques, as they are applicable only under specific circumstances and could not be used to estimate motion in other scenarios.

Level set methods describe the motion of contours within a set of two-dimensional planes as if those contours were cross sections of a three-dimensional shape intersected by the numerous parallel image planes.

A single equation representing the surface of the three-dimensional object in conjunction with a plane progression step size then suffices to describe contour motion. It is noteworthy that the level-set method can still be employed when a sequence of images is taken from a single plane over time, the sequence is then modeled as varying spatially rather than temporally. This is analogous to the manner in which motion estimation can be used to model spatial variation within a morphological structure, even though by definition it models time varying motion.

One important characteristic of that methodology, in contrast to the other motion estimation approaches, is that it describes the motion of only a small subset of points within each image, namely, those that compose a contour. Level set methods are employed in many applications, including interpolation problems, but not usually in those requiring motion estimation in a purer sense.

The optical flow-based strategy allows the description of complex non-translational motion with high resolution by assigning each individual pixel a unique motion vector. For scenarios involving complex motion that require high motion vector accuracy, optical flow methods can be attractive.

Control Grid Interpolation (CGI) and Adaptive Control Grid Interpolation (ACGI)

Figures 7, 8:
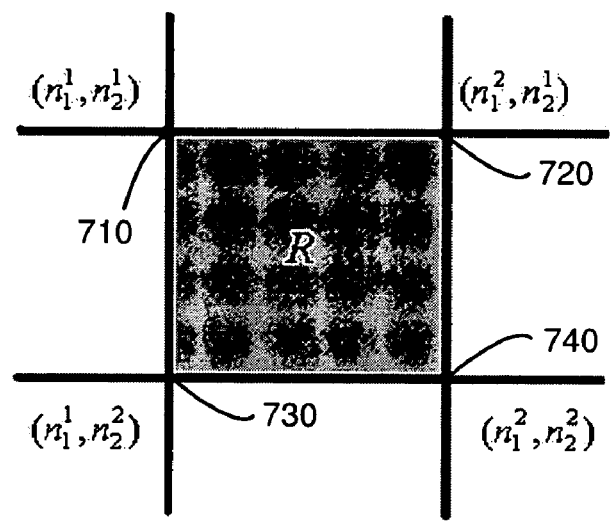
FIG. 7 is a diagram illustrating control point coordinates for a given region in a control grid interpolation (CGI) representation.
FIG. 8 is a diagram illustrating both connected and disconnected CGI representations.

Control grid interpolation (CGI) is a technique that is known to those having skill in the art. Thus, only a truncated discussion of CGI is presented herein. The CGI implementation assumes that the pixel displacement functions within some region R can be written as $$d_1(n) = \sum_{i=1}^{p} \alpha_i \theta_i(n) \quad 13$$

and $$d_2(n) = \sum_{i=1}^{q} \beta_i \phi_i(n), \quad 14$$

where $\theta_i(n)$ and $\phi_i(n)$ are independent basis functions used to describe the displacement field, $n=(n_1,n_2)$, and $\alpha_i$ and $\beta_i$ are the displacement parameters to be estimated. Equivalently these displacement equations can be written in vector form as $$d_1(n) = \overline{\alpha}^T \overline{\theta}(n) \quad 15$$

and $$d_2(n) = \overline{\beta}^T \overline{\phi}(n), \quad 16$$

where $\overline{\alpha}, \overline{\beta}, \overline{\theta}$, and $\overline{\phi}$ denote vectors with elements $\alpha_i, \beta_i, \delta_i$ and $\phi_i$ respectively. For rectangular regions, the basis functions within each region R can be written explicitly as $$\theta_1(n_1, n_2) = \phi_1(n_1, n_2) = \left(\frac{n_1^2 - n_1}{n_1^2 - n_1^1}\right)\left(\frac{n_2^2 - n_2}{n_2^2 - n_2^1}\right), \quad 17$$

$$\theta_2(n_1, n_2) = \phi_2(n_1, n_2) = \left(\frac{n_1^2 - n_1}{n_1^2 - n_1^1}\right)\left(\frac{n_2 - n_1^1}{n_2^2 - n_2^1}\right), \quad 18$$

$$\theta_3(n_1, n_2) = \phi_3(n_1, n_2) = \left(\frac{n_1 - n_1^1}{n_1^2 - n_1^1}\right)\left(\frac{n_2^2 - n_2}{n_2^2 - n_2^1}\right), \quad 19$$

and $$\theta_4(n_1, n_2) = \phi_4(n_1, n_2) = \left(\frac{n_1 - n_1^1}{n_1^2 - n_1^1}\right)\left(\frac{n_2 - n_2^1}{n_2^2 - n_2^1}\right), \quad 20$$

where $(n_1^1, n_2^1)$ denotes the coordinates of the upper left corner of the rectangular region and $(n_1^2, n_2^2)$ the coordinates of the lower right corner. An example of a rectangular region labeled with this coordinate system is displayed in FIG. 7. Specifically, the control points 710, 720, 730, 740 define the corners of the shaded region R.

It is noteworthy that, at each corner of a region, only one of these basis functions is equal to one, while the others have a value of zero. This corresponds to a bilinear model governing variation of the displacement field within each region. As dictated by the basis functions, the displacement parameter vectors $\overline{\alpha}$ and $\overline{\beta}$ each have four components as well.

The motion model disclosed herein is a connected model, meaning that the parameters associated with a given region's corner point are also valid for that point in the other three regions of which that point is a member. This relationship between neighboring regions contributes to the smoothness of the displacement field, as local displacements in separate regions are not totally independent and adjacent regions, as a whole, are guaranteed to be continuous with respect to motion. Global information is thus incorporated in local displacement estimates and the entire resultant displacement field varies smoothly as it should, given the typically-smooth variation of the imaged morphology. Alternatively, the model need not necessarily be implemented in a connected fashion for desirable results to be obtained. In many cases, a disconnected model, in which control points for neighboring regions are calculated independent of each other, yields similar results. The disconnected-model approach involves less computation because the effects of altering a single control point are less widespread. However, the disconnected model does result in a slightly less compact representation of the motion field, as each set of nine regions will contain 36 independent motion vectors as opposed to 16 in the connected case. This fact is displayed in FIG. 8. The 16 motion vectors for the left-hand side, as well as the 36 motion vectors for the right-hand side, are numerically labeled in FIG. 8.

The use of generalized motion models or equivalents is also known to those having skill in the art. In the generalized motion model described here, the displacement vector at each pixel is represented as a linear sum of the previously outlined basis functions. The p+q model parameters from Eqs. 13 and 14, in this case eight of them, are estimated within each region of support. To do this efficiently the optical flow equation at time k+δk is represented with a first order Taylor series expansion. Making this substitution, the brightness constraint given by $$I[n_1,n_2,k]=I(n_1+d_1[n_1,n_2,k],n_2+d_2[n_1,n_2,k],k+\delta k), \quad 21$$

is converted to $$I[n,k] \approx I[n,k,+\delta k] + \frac{\partial I[n,k+\delta k]}{\partial n_1}d_1(n) + \frac{\partial I[n,k+\delta k]}{\partial n_2}d_2(n), \quad 22$$

where, again, $n=(n_1,n_2)$. Thus Eq. 22 provides a discrete-time approximation of the optical flow equation:

$$\frac{\partial I(x,y,t)}{\partial x}v_x^* + \frac{\partial I(x,y,t)}{\partial y}v_y^* + \frac{\partial I(x,y,t)}{\partial t} = 0. \quad 6$$

Expressing this equation explicitly in terms of the model parameters from Eqs. 15 and 16 we obtain $$I[n,k] \approx I[n,k+\delta k] + \frac{\partial I[n,k+\delta k]}{\partial n_1}\overline{\alpha}^T\overline{\theta}(n) + \frac{\partial I[n,k+\delta k]}{\partial n_2}\overline{\beta}^T\overline{\phi}(n). \quad 23$$

Eq. 23 is assumed to hold for all pixels within R. In order to calculate the optimal displacement model parameters, the weighted squared error function (WSE)

$$\tilde{E}(\overline{\alpha},\overline{\beta}) = \sum_{n \in R} W(n) \left( \begin{array}{c} I[n,k] \\ -I[n,k+\delta k] \\ -\frac{\partial I[n,k,\delta k]}{\partial n_1}\overline{\alpha}^T\overline{\theta}(n) \\ -\frac{\partial I[n,k,+\delta k]}{\partial n_2}\overline{\beta}^T\overline{\phi}(n) \end{array} \right)^2 \quad 24$$

is minimized where W(n) is a weighting function. This function is chosen to be uniform if there are no displacements to be emphasized or de-emphasized. Algorithm performance can be increased for medical image processing by weighting insignificant regions outside of the patient's body accordingly. The minimization of Eq. 24 applies the previously mentioned smoothness constraint required to satisfy the optical flow equation listed in Eq. 6. Thus Eq. 24 ensures that incoherent displacement vectors are avoided and that the displacement field is locally coherent as dictated by the anatomy. There are several iterative loops within the error minimization routine. The inner most loop is an optimization algorithm, such as a gradient descent minimization algorithm or a conjugate gradient approach, which are both known in the art.

Minimizing the WSE within each region is an iterative process. In some embodiments, a multivariate conjugate gradient descent methodology is employed. During that process the parameters for all but one control point are held constant so that the number of unknowns is limited and a solution may be obtained.

Each time a minimization is performed, the acquired values for the parameters associated with a given control point are used in the error minimization for the next control point. In the connected motion model scenario the WSE expression is successively minimized for each of the control points numbered 910, 920, 930, 940 in FIG. 9. Note that because of the connected nature of the algorithm, the WSE expression applies to the entire nine-block neighborhood displayed in FIG. 9, even though the control points bound only the inner black block 950. This results in more computation in evaluating the WSE than would be associated with a disconnected model, but offers a more compact representation of the motion parameters and ensures motion field smoothness.

Once the WSE has been minimized for each of the control points illustrated above, updated values for the displacement functions $d_1(n)$ and $d_2(n)$ are available. Successive iterations of the parameter estimation routine are conducted by repeating the Taylor series expansion at $(n_1+d_1(n),n_2+d_2(n))$ instead of $(n_1,n_2)$. Termination is based on the true error rather than the error approximation. To evaluate this criterion, the mean-squared error (MSE) between the actual acquired image and the displacement corrected version of its adjacent neighbor $$E(\overline{\alpha},\overline{\beta}) = \sum_{n \in R} \sum W(n) \left( \begin{array}{c} I[n,k] \\ -I\left[ \begin{array}{c} n_1 + \\ \overline{\alpha}^T\overline{\theta}(n), n_2 + \\ \overline{\beta}^T\overline{\phi}(n), k + \\ \delta k \end{array} \right] \end{array} \right)^2 \quad 25$$

is computed. The update procedure is carried out by minimizing the predicted or estimated error given in Eq. 24. Minimization of this function does not necessarily guarantee minimization of the true error as described by Eq. 25. Typically, however, the minimization of the error approximation does coincide with a corresponding decrease in the true error. To ensure this is the case, the true error itself is used as the termination criterion while the more efficiently computed error estimation is used in the parameter update routine because it is frequently calculated. Experimental results have shown that use of the true error function in the parameter estimation routine leads to marginally better results in some cases, but demands considerably more computation. Conversely, the use of the error approximation as the termination criteria yields lower quality results, but is not accompanied by a significant increase in efficiency. For these reasons, the algorithm is best configured with the true error function serving as the termination condition and the error approximation functioning in parameter estimation.

In summary, a preferred embodiment of the parameter estimation routine for a given single region of the image is characterized by the following steps:

1. Initialization: Initialize the parameter vectors $\bar{\alpha}_0$ and $\bar{\beta}_0$ and set the intermediate iteration counter to z=0. Evaluate the true error function with the initial values and store the result.

2. Error approximation: Perform the Taylor Series Expansion and evaluate Eq. 24 to determine the approximate error function given the current parameters.

3. Conjugate Gradient Descent and Update: Execute the gradient descent algorithm, minimizing the approximate error function for each of the control points for a given region in succession, while holding the other three constant. Here the incremented motion parameters for a given control point are used in the error minimization for the next. This step results in the update of the motion parameter vectors $\bar{\alpha}_z$ and $\bar{\beta}_z$.

4. Evaluation: Evaluate Eq. 25 in order to assess the true error associated with the current motion parameters, and store value.

5. Termination Testing: Initially the true error value from step 4 is compared to that computed in step 1. For successive iterations the true error from step 4 is compared to the true error from step 4 of the previous iteration. If a sufficiently small error decrease is achieved then terminate. If not then increment the outer iteration counter z and return to step 2.

The displacement field associated with inter-slice reconstruction can be complex, in which case large blocks may not adequately capture the motion information. High WSE values indicate such situations. In one embodiment of the inter-slice reconstruction application these regions are typically localized, hence, the need for block subdivision is present only in certain regions of the image. Simply put, it does not make sense to further subdivide regions where error will not be decreased by subdivision. In the interest of efficiency the algorithm forgoes subdivision of such regions. The algorithm begins with an initial partitioning of the image. Blocks are subdivided using quad trees when the WSE exceeds an empirically determined threshold, hence the name adaptive control grid interpolation (ACGI). Block subdivision is terminated when a minimum block size is reached or when the WSE falls below a pre-specified distortion threshold. This approach makes the algorithm as a whole more robust and suitable for a variety of applications.

This adaptive component is implemented in a loop outside the parameter estimation routine. The parameter estimation routine is applied to a single block within the image. After convergence has been reached, the magnitude of the true error function is considered. If subdivision occurs, the parameter estimation routine is then applied to each of the resultant blocks.

In one embodiment, among others, termination may also be reached when a minimum block size has been obtained. Through this process the motion field for the entire image is acquired. The adaptive component of the algorithm ensures that block subdivisions, and the computations that accompany them, are performed only where they are beneficial. An illustration of a case where subdivision was warranted in some regions and not in others is displayed in FIG. 10A, where an asymmetric quad tree is observed. Alternatively the symmetric quad tree displayed in FIG. 10B results without the adaptive component of the algorithm, and requires additional computation with little benefit.

In summary, a preferred embodiment of the entire motion field derivation process is characterized by the following steps:

1. Image Subdivision: Subdivide image using the quadtree structure. Evaluate block size and store value.

2. Parameter Estimation: Perform estimation of motion parameters for each of the current subdivisions.

3. Termination Test: Taking the true error determined in step 2, test to see if the true error for each region is sufficiently small to fall below the specified threshold. If the error for a given region remains excessive, then return that region to step 1. The exception to this rule occurs when the minimum specified block size is reached. In this case the algorithm terminates for the specified region regardless of error.

In the ACGI representation, the displacement field is obtained by partitioning the image into contiguous rectangular regions. The corners of these regions form control points that are used as the anchors from which the displacement vectors in between are derived via bilinear interpolation.

Figure 11:
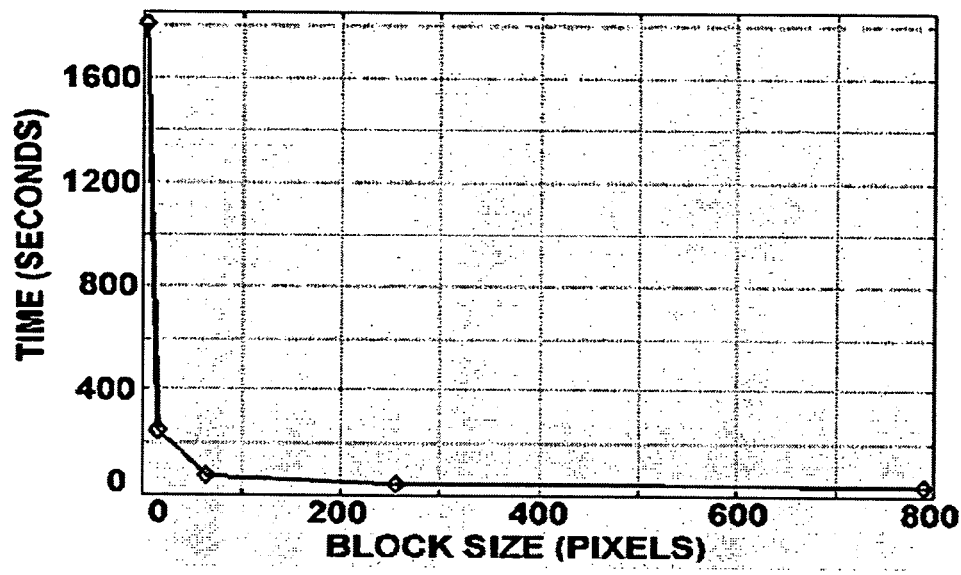
FIG. 11 is an example plot showing computation time plotted as a function of block size bounded by control points for a sample reconstruction image set.
Figure 12:
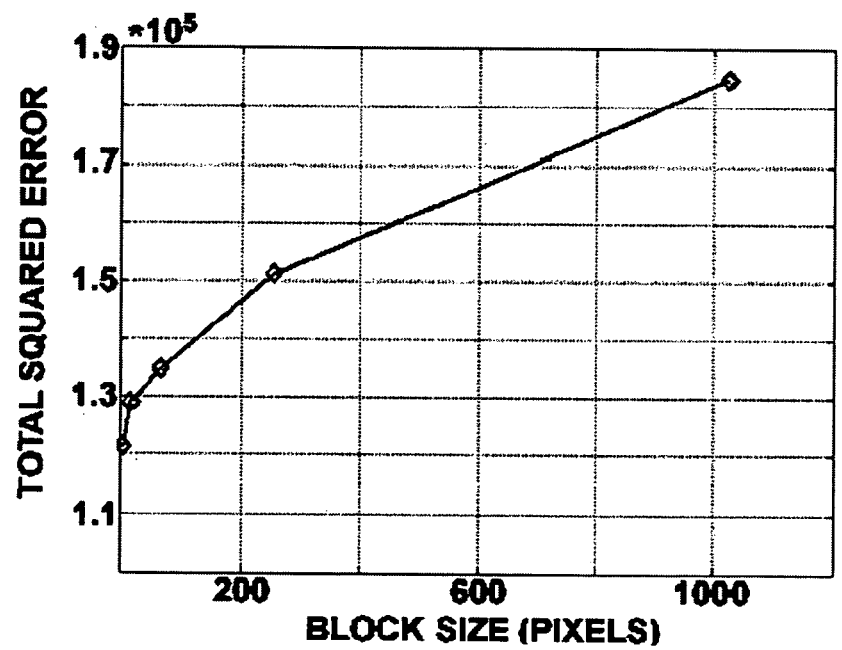
FIG. 12 is an example plot showing total squared error as a function of block size bounded by control points for a sample reconstruction image set.

There is a tradeoff between computation time and the error associated with the resultant displacement field when the block size bounded by control points is varied. Smaller block sizes lead to a more accurate displacement field, but require more computation. In situations that are not time-sensitive the block size can be chosen such that each pixel acts as a control point. When the amount of time devoted to computation is a more significant consideration, larger block sizes can be selected to decrease computation time, typically with only a small increase in the motion field error. These facts are illustrated in FIG. 11 and FIG. 12 where computation time and total squared error for a sample image set are plotted as a function of pixel block size. In both figures pixel block size on the horizontal axis is expressed as the total number of pixels contained within a square region bounded by control points.

The displacement of pixels from one slice to the next is modeled as a time varying process. This allows two slices acquired from different spatial locations to be connected in the sense of optical flow. In the reconstruction scenario the out-of-plane spatial coordinate corresponds directly to the time variable associated with optical flow. Two characteristics of the data to be reconstructed are noteworthy. First, all images composing a data set for reconstruction are available simultaneously. Second, the reconstruction of data between any two neighboring images is unaffected by other images. Because of these facts, there are typically no causality implications involved in reconstruction; each image pair is available and the calculations associated with it are independent. For these reasons the application of ACGI to data reconstruction is a suitable candidate for parallelization. Furthermore, there is no directional bias associated with reconstruction. Execution of the algorithm in either direction through an image set yields identical results.

An issue completely separate from the motion associated with ACGI is patient movement during MR data acquisition. Since MR data acquisition is known in the art, only a cursory discussion of various issues associated with MR data acquisition is provided herein. Our general assumption is that the patient remains still during the image acquisition phase. Furthermore the assumption is made that the imaged anatomy itself remains stationary during data acqusition. Truly speaking, this assumption is flawed as vascular structures within the chest do undergo some periodic motion. Cardiac and respiratory gating during MR data acquisition help alleviate this problem.

In the context of optimization it is clear that an initial guess far from the desired minimum may require that the algorithm converge over a greater distance. Under these circumstances improved efficiency in minimizing WSE can be achieved by refining the starting point. Because motion parameters for certain regions are calculated prior to the determination of motion vectors for other regions, some a priori information is available for subsequent calculations.

Since the motion model is "connected" the vectors associated with a control point in a neighboring region, although not directly involved in the WSE minimization for another region, can offer some insight into the values that will be obtained for motion vectors in that other region. Given the smoothness of the motion field, previously calculated motion vectors from neighboring regions could be used to obtain a better initial guess for the values of motion vectors in other regions. This would effectively decrease the distance over which the gradient descent algorithm must converge.

It is also clear that efficiency is affected by the step size that the optimization algorithm takes toward convergence. The avaialable a priori information may also be useful in determining more appropriate values for this quantity. Specifically, a discretized strategy in which neighboring control point motion vectors are used to select between alternative increment thresholds could prove to be an improvement over the generalized case.

The approximate error function in Eq. 24 relates error to a number of variables and is not readily amenable to explicit minimization. However, the values for three of the four control points are held constant while the error function is minimized with respect to the parameters of a single control point. Within that framework, it is possible to derive an explicit solution for the minimization of the error function with respect to a single parameter. Although such a calculation is complex, it would replace the entire multivariate gradient descent in this application. Within that framework, a matrix inverse is employed to determine the parameters associated with error minimization directly. Since such processes can be readily appreciated by those having skill in the art, only a truncated discussion of such processes is provided herein.

The prospect of computing motion vectors with fixed point precision could offer a significant improvement for ACGI in terms of efficiency. The technique, disclosed herein, calculates the motion vectors to an arbitrary precision based on minimizing the approximate error. This arbitrary degree of sub-pixel accuracy is valuable in applications where very high quality is desired. If motion vectors were limited to a fixed precision prior to interpolation, then the resultant precision of the interpolated motion vectors would be known. In this scenario the greatest possible resolution in terms of where any given motion vector might point would also be known. With images interpolated to sufficient resolution prior to motion estimation, one could ensure that any given control point motion vector, or interpolated motion vector, would point to a discrete location on the super-resolution grid. Eliminating the prospect of any motion vector pointing to some location off the predefined dense grid would greatly simplify the error estimation calculation. It is likely that this improvement would offer the greatest benefit in terms efficiency in comparison to the other prospective improvements outlined in this section.

Thus far, all of the proposed improvements for ACGI have been associated with efficiency. Alternative forms of the optical flow equation may have a negative impact in terms of efficiency, but might produce a more accurate motion field. More complex optical flow models are typically accompanied with increased computation. With ACGI however, optical flow calculations are not performed for every pixel as in traditional implementations. As a result it might be possible to incorporate a more complex optical flow model, leading to higher accuracy interpolated motion fields, without the associated loss of efficiency that has been normally observed with such models. Two potential variations that could produce such benefits are the use of an altered form of the optical flow equation itself and the use of a modified smoothness constraint.

The extended optical flow constraint (EOFC) is an alternate form of the optical flow constraint equation that includes additional terms. As with the continuity equation, the EOFC allows the representation of motion both within and across boundaries. The basic optical flow equation is more limiting, so some available information is not used in deriving the motion field. Use of the EOFC has been shown to capture more detail in complex motion fields than the basic optical flow equation.

Another option for improving the accuracy of the optical flow component of the proposed methodology may be the use of a modified smoothness constraint. In general this approach allows the preservation of motion resolution near edges, contrary to the traditional optical flow implementation that can overly smooth motion information in such regions.

The ACGI implementation, disclosed herein, offers an attractive solution for inter-slice MR image reconstruction. ACGI has the ability to describe complex non-translational motion like that observed in anatomical variation from slice to slice in contiguously acquired MR image sets. Additionally, ACGI is able to perform in this role with greater computational efficiency than other methods that offer comparable results. The algorithm partitions the image into sub-blocks of appropriate size to capture characteristics of anatomical transition and can succesively subdivide regions where WSE remains large. This enables the algorithm to handle both translational and complex non-translational displacements by way of the optical flow equation. These characteristics of the algorithm allow users to obtain an accurate and dense representation of the displacement field at a reasonable computational cost.

The starting point for the morphological reconstruction process is a series of transverse contiguously acquired anatomical images.

When discussing interpolation in the context of this work it is useful to distinguish between the intra-frame interpolation function relating control points in the ACGI framework, and the inter-frame interpolation pertaining to the approximation of an image at some time $k+\delta k$ based on a field of motion vectors. In this disclosure, interpolation refers to the inter-frame interpolation, unless otherwise indicated. Recall that Eq. 21 relates the pixels on a sampled grid at time k to those at arbitrary coordinates in an image at time $k+\delta k$. Because the image at time $k+\delta k$ is also sampled on a discrete grid, interpolation is necessary to determine $I(n_1+d_1[n_1,n_2,k],n_2+d_2[n_1,n_2,k],k+\delta k)$. Theoretically optimal resampling under the assumption of a bandlimited image can be achieved with an infinite length sinc function. Here, nearest neighbor, bilinear, and bicubic interpolation strategies are employed to approximate the sinc function.

Nearest neighbor interpolation is one of the simplest schemes, in which pixel coordinates are simply rounded to the nearest integer value. This action corresponds to a crude approximation of the sinc function with a rectangular function. Since nearest-neighbor interpolation is known in the art, further discussions of the details related to nearest-neighbor interpolation is omitted herein.

Bilinear interpolation approximates values between pixels by linear interpolation in both directions. The value for a pixel at location $(n_1,n_2)$ is determined by $$I(n_1, n_2) = h_2^T \begin{bmatrix} I(\lfloor n_1 \rfloor, \lfloor n_2 \rfloor) & I(\lceil n_1 \rceil, \lfloor n_2 \rfloor) \\ I(\lfloor n_1 \rfloor, \lceil n_2 \rceil) & I(\lceil n_1 \rceil, \lceil n_2 \rceil) \end{bmatrix} h_1 \qquad 26$$

where $$h_2 \begin{bmatrix} h(n_2 - \lfloor n_2 \rfloor) \\ h(n_2 - \lceil n_2 \rceil) \end{bmatrix}, h_1 \begin{bmatrix} h(n_1 - \lfloor n_1 \rfloor) \\ h(n_1 - \lceil n_1 \rceil) \end{bmatrix} \qquad 27$$

and $$h(n) = 1 - |n|, \qquad 28$$

where n can assume values of $(n_i - \lfloor n_i \rfloor)$ or $(n_i - \lceil n_i \rceil)$ for i=1,2. Since bilinear interpolation is also known in the art, further discussion of bilinear interpolation is also omitted herein.

Bicubic spline interpolation better approximates the ideal sinc function with a third-order kernel according to the equation $$I(n_1, n_2) = h_2^T T h_1 \qquad 29$$

where $$h_2 = \begin{bmatrix} h(n_2 - \lfloor n_2 \rfloor - 1) \\ h(n_2 - \lfloor n_2 \rfloor) \\ h(n_2 - \lceil n_2 \rceil) \\ h(n_2 - \lceil n_2 \rceil + 1) \end{bmatrix}, h_1 = \begin{bmatrix} h(n_1 - \lfloor n_1 \rfloor - 1) \\ h(n_1 - \lfloor n_1 \rfloor) \\ h(n_1 - \lceil n_1 \rceil) \\ h(n_1 - \lceil n_1 \rceil + 1) \end{bmatrix}, \qquad 30$$

$$T = \begin{bmatrix} I(\lfloor n_1 \rfloor - 1, \lfloor n_2 \rfloor - 1) & I(\lfloor n_1 \rfloor, \lfloor n_2 \rfloor - 1) & I(\lceil n_1 \rceil, \lfloor n_2 \rfloor + 1) & I(\lceil n_1 \rceil + 1, \lfloor n_2 \rfloor - 1) \\ I(\lfloor n_1 \rfloor - 1, \lfloor n_2 \rfloor) & I(\lfloor n_1 \rfloor, \lfloor n_2 \rfloor) & I(\lceil n_1 \rceil, \lfloor n_2 \rfloor) & I(\lceil n_1 \rceil + 1, \lfloor n_2 \rfloor) \\ I(\lfloor n_1 \rfloor - 1, \lceil n_2 \rceil) & I(\lfloor n_1 \rfloor, \lceil n_2 \rceil) & I(\lceil n_1 \rceil, \lceil n_2 \rceil) & I(\lceil n_1 \rceil + 1, \lceil n_2 \rceil) \\ I(\lfloor n_1 \rfloor - 1, \lceil n_2 \rceil + 1) & I(\lfloor n_1 \rfloor, \lceil n_2 \rceil + 1) & I(\lceil n_1 \rceil, \lceil n_2 \rceil + 1) & I(\lceil n_1 \rceil + 1, \lceil n_2 \rceil + 1) \end{bmatrix}, \qquad 31$$

and $$h(n) = \begin{cases} 1.5|n|^3 - 2.5|n|^2 + 1 & 0 \le |n| < 1 \\ -.5|n|^3 + 2.5|n|^2 - 4|n| + 2 & 1 \le |n| < 2 \\ 0 & 2 \le |n| \end{cases}, \qquad 32$$

where n can assume values of $(n_i - \lfloor n_i \rfloor)$, $(n_i - \lceil n_i \rceil)$, $(n_i - \lfloor n_i \rfloor - 1)$ or $(n_i - \lceil n_i \rceil + 1)$ for i=1,2. Since bicubic spline interpolation is also known in the art, further discussion of bicubic spline interpolation is also omitted herein.

In general, there are several notable differences when comparing the performance of these interpolation strategies. Differences between results produced by bilinear and bicubic interpolations are most evident near boundary regions. Bicubic interpolation introduces slightly less blurring near edges although the discrepancy is not profound in most cases. In such regions the nearest neighbor approach results in noticeable distortion in the form of pixelation. Bilinear interpolation is used most frequently in this work because of the favorable tradeoff it offers in terms of performance and computational simplicity.

Following data acquisition, fields of displacement vectors are calculated describing the displacement of pixels from one image slice to another. This is accomplished via ACGI, as described above. In general, the application of motion estimation as a precursor to interpolation for MR data reconstruction is a new approach that distinguishes this technique from others.

From the dense displacement field and the associated pair of MR slices, intermediate images are reconstructed. By following one of the displacement vectors a portion of the way from one slice to the next, a linear approximation of where a given pixel would be found in an intermediate slice can be made.

This step of the algorithm is more complex than it appears at first glance. Because the intersection of a given motion vector with an intermediate image plane is not guaranteed to occur at a discrete location, and in practice usually does not, an additional interpolation is required. This interpolation is similar to the one described above, but is complicated by the fact that the pixel intensities on the dense grid at the intermediate location are not known. These are the values used to construct the image. By examining the motion vectors that intersect the intermediate image plane nearest a discrete location in each of the four surrounding quadrants, one can obtain the information for performing the next interpolation. Following these vectors back to the known image, it is possible to determine the coordinates from which they originate. There is also a vector originating from the known image that passes through the discrete location in question on the intermediate image grid. At this point an interpolation equation is solved to determine the arbitrary location in the known image from which this vector originates. Once these arbitrary coordinates in the known image are obtained, interpolation can be performed to determine the pixel intensity there. This is the pixel intensity that is found at the discrete location in the intermediate image according to the motion solution that has been established.

Repeating this process for all pixels in a given slice produces a reconstruction. Pairs of these reconstructed images are then combined in a spatially weighted sum to form a single interpolated slice. To illustrate this process, consider two contiguous MR slices, image A and image B. There are two motion fields used to arrive at an interpolated image between the known frames: one mapping image A to image B, and the other mapping image B to image A. While intuitively it seems that these two fields would be identical, the fact is that when computed they are very similar but virtually never identical. So at some location between frames A and B, the approximation of an image can be made from the motion field mapping A to B, or the motion field mapping B to A. Incorporating multiple approximations of a single image into the intermediate frame generation process allows all available information to be used in interpolation. Specifically, this limits the contribution of anomalies that might be present when only one approximation is used.

In one embodiment the image a small portion of the way from image A to image B is expected to be very similar to A, the approximation of this image based on the motion field mapping image A to image B is weighted more heavily in the sum. Specifically, this is preferably done linearly such that the weighting coefficient for each image approximation reflects the distance from that approximation to the origin of the motion field used to approximate. If the approximation location is separated from the source of the motion field used to derive it by a distance $d_a$, and the total distance between the two original images is $d_t$, then the coefficient for that given image approximation in the weighted sum, $C_a$, is given by $$C_a = 1 - \left(\frac{d_a}{d_t}\right).$$

This process is then repeated at different approximation locations and several interpolated images are stacked between the known images in anatomical proportion to produce a three-dimensional enhanced data set. The interpolation referred to in this section, although linear in some respects, is completely separate from the aforementioned bilinear interpolation employed in ACGI to derive the motion field. In this case the notion of interpolation refers to the approximation of an entire image.

In one embodiment the slice thickness of interpolated frames is dictated by the number of frames generated and the slice thickness associated with the original data set. Taking into account both of these parameters, proportionality is maintained between reconstructed data and the imaged morphology. In general the goal is to enhance the out-of-plane resolution to the point that it becomes equal to the in-plane resolution of the originally acquired images. There is no theoretical upper bound associated with the number of intermediate images that can be generated.

Stated differently, once a motion field linking two images has been determined, the generation of an intermediate image often requires several steps. In order to determine pixel intensity values in the intermediate image, the intersections of each motion vector and the intermediate image plane are considered. Every pixel in the intermediate image has a discrete Cartesian location. The motion vectors linking the two images bounding the new plane, however, pass through that plane at arbitrary coordinates. Accordingly, one can examine a pixel location in the intermediate image and find the motion vector intersections closest to that location in each of the four quadrants surrounding it. Based on the intensity values from which these motion vectors originate, a bilinear interpolation can be performed to yield the pixel intensity for the intermediate image. That process involves a single motion field, but since there are two images bounding the intermediate plane, one linking the first image to the second and another linking the second to the first, one can arrive at two different image approximations for the intermediate plane. The accuracy of an approximation is customarily greater if the intermediate plane is in close proximity to the image of origination for the motion field being used to interpolate. For this reason the two different approximations of an intermediate image are combined in a weighted sum where the coefficients vary linearly with respect to the distance between the original frames and the intermediate plane. For other embodiments, the weighting can be adjusted so that nonlinear weighting coefficients can be applied.

After assembling the dense set of originally acquired and reconstructed MR images, each image is segmented with a semi-automated routine prior to visualization or computational analysis. This segmentation algorithm is intensity based, but uses a novel "rolling ball" approach that differs from other common intensity based techniques such as region growing and thresholding. Accompanying this segmentation strategy is a super resolution enhancement technique that increases the accuracy of initial segmentations.

The rolling ball segmentation algorithm used here is similar in some ways to the classical watershed approach. In that approach, a region to be segmented within two or three-dimensional space is effectively filled up as it would be if water were poured into it. Since various rolling-ball approaches are known to those having skill in the art, only a cursory discussion of such a process is disclosed herein.

Boundary gap problems, which can often arise, may be addressed in several ways. Preferably, larger particle sizes, which can be used to fit through the gaps in the border but small enough to define the region of interest sharply, can be used to address boundary gap problems.

There is a tradeoff between resolution and smoothing associated with particle size. Larger particles effectively low pass filter the edges of a region to a greater degree. Small undulations in the vessel surface are not retained when larger particle sizes are used. Conversely, smaller particles retain higher border resolution, but run a greater risk of slipping through the cracks in the initially defined boundary. Thus, it is desirable to define a particle size of appropriate dimensions. As noted above, since such rolling ball techniques are known in the art, further discussions of such techniques are omitted hereafter.

In practice the rolling ball algorithm is executed as a special case of region growing so that computation and decision are only required at the frontier of the expanding area of interest. The smallest unit of local region growth is defined as if the ball were rolling out of the already segmented area. This adaptation of the concept eliminates redundant motion of the ball over paths already encompassed by the existing segmentation.

The definition of the potential field can be adjusted to obtain results with differing characteristics. Results from the rolling ball routine show a substantial improvement over manual segmentations. Various examples of such improvements are provided in U.S. provisional patent applications having Ser. Nos. 60/478,547 and 60/478,665. Some examples are also provided in the Frakes thesis.

The group of pixels defining the boundary region of a blood vessel within an MR image is often composed of varying intensity values transitioning from the value observed within the fluid contained by the vessel and that observed in the tissue surrounding it. In reality the boundary between the fluid and the vessel wall is infinitely thin. Hardware limitations associated with MR imaging resolution result in the acquisition of pixels that span this boundary. Accordingly the intensity values recorded at these sites are a combination of the intensity corresponding to the fluid, and that corresponding to the vessel wall. In any image these two values can be approximately determined by examining pixels that are contained entirely within the fluid and tissue regions respectively. Based on these values, an approximation of the portion of a given partial volume pixel that belongs in each of the respective areas can be made.

In the disclosed technique, this approximation is based on a probability map derived from the intensity values of partial volume pixels. Preferably, this probability map is determined in a fully automated fashion, allowing this entire procedure to be executed without user input. After being identified, pixels spanning the boundary region are subdivided using a quad tree structure and fluid or tissue intensity values are assigned to the new super resolution pixels based on the probability map. This portion of the algorithm is recursive, allowing an arbitrary degree of sub-pixel resolution to be obtained, although the benefits after several iterations are minute. The operation is conservative in terms of intensity, meaning that no greater or lesser amount of signal is reflected in the enhanced image. Rather, intensity is reallocated within the boundary region to produce a more accurate segmentation.

Although the super-resolution enhancement phase is fully automated, it does demand an initial segmentation. This is provided by the rolling ball technique. The combination of these two components creates a powerful automated tool for high-resolution vascular segmentation.

The interpolation, which is described above, applies to the velocity reconstruction as well. The starting point for the velocity reconstruction algorithm is a set of contiguous images acquired similarly in a spatial sense to those acquired for morphological reconstruction. However, the images to be reconstructed in this application contain phase encoded velocity data rather than morphological information. The physics behind phase encoded velocity imaging has been extensively explored, and the technique has been well validated in numerous studies. For this reason, further discussions of MR velocity imaging and velocity encoding techniques are omitted herein.

The intermediate frame generation component of the velocity reconstruction begins in a similar fashion. Motion vectors are calculated between two neighboring modulus images as described above.

Once a field of motion vectors has been determined describing the movement of pixels from one image to another, interpolation is performed as in the morphological case with one important exception. Unlike the morphological example, above, the images used to carry out the interpolation are the phase encoded velocity images rather than the modulus images that are used to determine the motion field. So morphological information is used to calculate the motion field even in the velocity case, but it is the velocity data that are interpolated. This methodology is employed because the low contrast displayed in the phase-encoded velocity images would normally be poorly suited to establish motion vectors linking similar regions in adjacent images.

Intermediate velocity frames are formed via the combination of approximated images in a weighted sum. The number of intermediate frames is again selected to achieve an out-of-plane spatial resolution similar to that present in the originally acquired images. Here three separate sets of intermediate frames are generated for each flow model, one for each component (e.g., x-component, y-component, z-component) of velocity. These three single component reconstructions are combined in post-processing and visualization applications. Slice thicknesses for the intermediate frames are determined in the same fashion as in morphological reconstruction, to maintain proportions with respect to the original model. It is noteworthy that this does not require information about the model itself. This calculation is carried out based exclusively on the slice thickness associated with the original data and the number of intermediate images generated.

In comparison to the morphological case, it is more difficult to show directly the improvement of the reconstructed velocity data over an originally acquired set. However, the product of the reconstruction algorithm can be visualized in part with out-of-plane reconstructed frames.

Segmentation in the velocity case is carried out using the modulus images from the scan. Because these images are effectively taken from the same spatial location at the same time as the corresponding velocity images, this is justified. The higher contrast exhibited in the modulus images facilitates segmentation as opposed to segmenting the velocity images directly. Segmentation masks derived from the modulus images are applied to the corresponding velocity images. For this reason a series of modulus frames at the same spatial locations as the reconstructed velocity frames is also created so that each velocity image can be segmented using an appropriate modulus image mask. This frame generation phase is executed as described above for the morphological algorithm description. Once this entire process is complete, a reconstructed and segmented three-dimensional field of three-dimensional velocity vectors is available.

It should also be noted that, for velocity images in which fluid flow is calculated, additional a priori information is available. Specifically, as dictated by fluid physics, the divergence of any real flow field must be equal to zero. For any element, in this case a voxel, within a three-dimensional velocity data set this means that $$\frac{du}{dx} + \frac{dv}{dy} + \frac{dw}{dz} = 0. \qquad 34$$

In this divergence equation, u, v, and w are the respective components of velocity. By adding a term into the error minimization process that includes the divergence value, a more accurate motion estimation may be obtained. Simply put the estimation process guarantees that the motion vectors being generated are consistent not only with the image data present, but also with the laws of physics that are known to govern the underlying data.

Various results of different applications to anatomical and velocity imaging data are provided in U.S. provisional patent applications having Ser. Nos. 60/478,547 and 60/478,665, and, also, the Frakes thesis. Thus, further discussion of such results is omitted here.

In addition to the above-described MR morphology and MR flow applications, ACGI works well for a number of other applications. The robust nature of the algorithm in the context of other applications underscores the versatility of the ACGI framework.

Atmospheric turbulence is a naturally occurring phenomenon that can severely limit the resolution of long distance optical and infrared sensors. Because atmospheric turbulence can degrade the appearance of video captured by these sensors, many of which are already deployed in the field, there is much interest in employing enhancement/restoration processing to improve data quality during or after acquisition.

One approach to the problem is to use signal processing to suppress atmospheric turbulence effects in sensor video. This can be accomplished with ACGI. For that method a dense dynamic motion vector field is derived from the characteristics of the atmospheric turbulence as seen in the data. The vector field is then used as part of the distortion compensation process. Naturally occurring motion, such as that associated with the movement of objects within a stationary scene, can still be preserved. The resulting algorithm is shown to produce enhanced video of significantly higher quality than the original.

Atmospheric turbulence arises from a complex set of inter-related factors (e.g. wind velocity, temperature, elevation, sun intensity, etc.). For distant objects being viewed through a sensor, atmospheric turbulence produces blurring, and the time-varying nature of this turbulence causes those objects to appear to waver in a slow quasi-periodic fashion. Such a phenomenon is typically observed on a hot day at the airport above the heated tarmac where the air hovering close to the ground appears to ripple with a wavy motion. Similar distortions are also observed when viewing footage of distant planets or stars through a telescope. The observed degradation arises from refraction index fluctuations caused by moving air, which perturb the incident wave fronts of the reflected light.

In theory, one can model the physical process underlying atmospheric turbulence, and, based on that model, compensate for the distortion with Wiener filtering or other classical restoration methods. As with any model-based approach, the quality of restoration will depend on the accuracy of the model. In cases where the turbulence model is an explicit function of parameters that describe atmospheric conditions (e.g. temperature, wind velocities, humidity, and sun illumination) restoration can be difficult to implement.

Rather than attempting to model turbulence as a function of atmospheric conditions, one can exploit the property that the distortion effects are spatially local and temporally quasi-periodic. From that vantage point, the task is to estimate the spatially local displacement vectors dynamically and then to accurately reconstruct distortion-compensated image frames with high quality. Toward that end an algorithm based on ACGI can calculate vectors that describe pixel movement. That process forms the foundation upon which the turbulence suppression algorithm is built.

Figure 13:
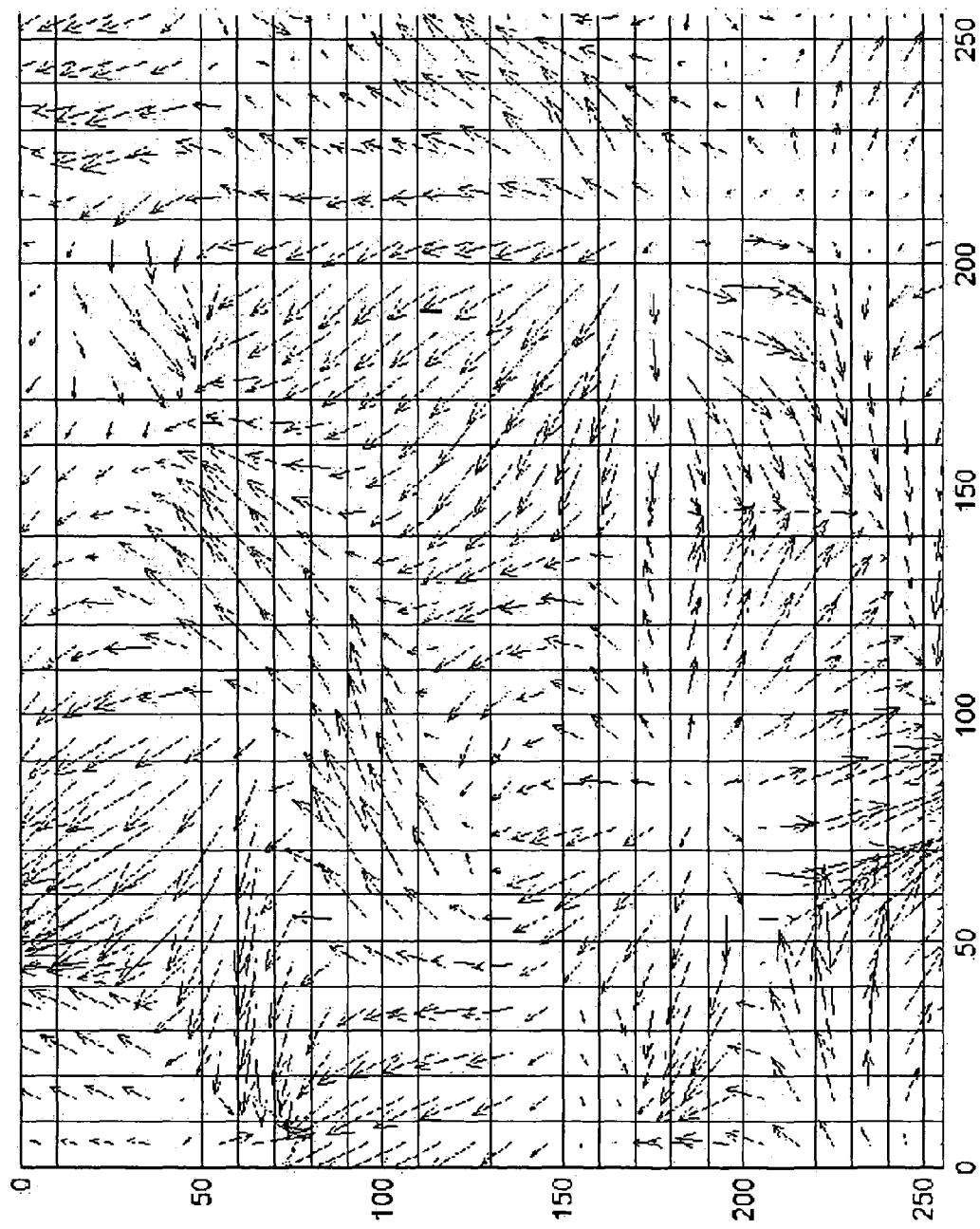
FIG. 13 is a diagram showing one example, among others, of a downsampled and magnitude enhanced motion vector field derived from adaptive control grid interpolation (ACGI) processing of a video sequence disturbed by atmospheric turbulence.

In the stable-state algorithm each scene displayed in the video to be restored is fixed in dimension, is stable in space (does not pan or zoom), and describes only stationary objects. The first step of the procedure is to increase image resolution by a factor of four using known interpolation methods, such as bilinear interpolation. The purpose of such interpolation is to facilitate sub-pixel accuracy. Next, spatial filtering is performed using an inverse-Laplacian emphasis filter to enhance the high frequency information contained in the individual frames. After spatial filtering, ACGI is used to calculate vectors that describe the movement of pixels from one image to another. This allows the determination of an accurate and dense motion field representation. FIG. 13 shows an example of the motion field for a turbulent frame obtained from the algorithm, where the motion field has been downsampled by a factor of 10 and the vector magnitudes have been scaled by a factor of 20 for visualization purposes. The motion vector fields provide a measure for correction from one frame to the next. Individually, they do not provide the information to return displaced pixels to their true location, since all frames in the sequence are likely to have undergone turbulent distortion. However, collectively the motion fields can be used to estimate true displacement. Since atmospheric turbulence is quasi-periodic, the turbulent motion vectors should sum to zero over a periodic cycle. Thus, the sum of the turbulent motion fields over time can be used, on an individual grid location basis, to find the "zero-crossings" which indicate points in time and space where the effects of turbulence are not present. By assembling these points from different grid locations and frames within the sequence, it is possible to piece together an undistorted base frame for compensation. This reference frame is established in a dynamic fashion, changing over time with respect to a sliding temporal window centered around the frame currently being restored. Once this base frame is determined for a given point in time, the vector fields mapping the corresponding turbulent frame back to the base frame can be used to correct for motion in the distorted image. Repeating this process for all frames generates a restored video sequence. The result of this restoration is a video sequence in which atmospheric turbulence is suppressed significantly. The video at this point is then filtered temporally to smooth intensity discontinuities that may have been induced by the turbulence, after which each frame is decimated back to its original size.

One problem that can arise during the restoration process involves the boundary region of the image. When the optimal motion solution results in vectors near the edge of the image that point to locations off of the image grid in the reference frame, the intensities corresponding to those vectors' destinations are uncertain. This scenario is typically observed when turbulence in these regions is severe enough to effectively change the portion of the complete scene that is observed by the sensor.

Many different padding techniques can be used in order to fill in information in regions outside of the image. These include zero-padding, noise-padding, and symmetric reflection. However, the information from these regions that is used in determining local motion estimates is not from the original scene, and as a result localized motion vector fields near image boundaries will be less accurate than those in the rest of the image. If substantial resolution is available, a more robust solution is to dynamically crop the product image to eliminate such regions. However, this requires more computation and results in lower and variable resolutions.

It is noteworthy that these less accurate regions customarily bound only a several pixel border around the outside of the image and are seldom detectable by an observer. In the event that turbulence is extreme, the span of these borders will increase.

Other problems for the restoration scheme arise when there are true and turbulent motions present in the scene. True motion would include such effects as panning and zooming, as well as objects moving within the turbulent scene. The case of moving objects within the scene is addressed by the dynamic state algorithm.

When objects are moving within the turbulent scene, the determination of the reference frame for correction is more complex. Clearly it is desirable to remove the turbulent motion without distorting the genuine motion that is present within the scene. To accomplish this, the true and turbulent components of motion should be distinguishable. The approach disclosed herein aims to do this once again by exploiting the quasi-periodic nature of the turbulence. In a scene containing only turbulent motion, the motion vectors associated with a given image exhibit quasi-sinusoidal behavior. By fitting a curve to this waveform it is possible to determine the zero-crossings of the turbulent motion, or the points in time when the turbulent contribution to motion is effectively zero. This component is executed as described in the stable state algorithm.

When true motion is present in a turbulent scene this sinusoid should be displaced from zero by some value, reflecting the magnitude of the true motion. The midpoint of the sinusoid can still be obtained here, allowing the determination of zero turbulence instances. In such instances the effects of turbulence are not present, but the real motion can still be captured as it is reflected in the offset of the sinusoidal midpoint from zero. Using such a process, the reference frame for motion compensation can be obtained in such a manner that genuine motion is not removed by the restoration process. Consequently turbulence-distorted frames can be corrected while genuine motion within the scene is retained.

It should be kept in mind that the original is a video sequence in which the scene appears to waver over time, creating a blurred effect. In an attempt to capture this video distortion in a single image for display purposes, the average of frames over one second were taken. The blurring that is seen in the original frames is caused by the motion artifacts from atmospheric turbulence. The time averaging does expose turbulence in this fashion, but interestingly it also alleviates some of the turbulent effects present in the single frames of the original sequence because of the inherent quasi-periodicity. This fact is used advantageously in the latter stages of the correction algorithm when temporal median filtering is employed.

The application of control grid interpolation to the correction of motion artifacts in video due to atmospheric turbulence is effective for a variety of distorted image sequences displaying stationary scenes. Unlike conventional motion estimation, the ACGI method can provide a dense motion field while avoiding excessive computational complexity.

The problem of tracking in video sequences has been addressed by others. Proposed solutions have included a variety of block-based and optical flow-based based motion estimation strategies. The general assumption associated with approaching video tracking from a motion estimation perspective is that, after an initial identification of a target within a time-varying video sequence, local motion estimation can be used to track a target from one frame to the next. Sequential motion determinations can thus be used to track the specified target throughout the duration of a video sequence. This applies to a variety of applications that demand the tracking of markers within a scene. One example, the tracking of athletic subjects in video, is the focus of this section.

Motion analysis through the creation of computer based dynamic models is a powerful tool in the study of athletic injury. In such cases, models must be based on an underlying data source, and perform realistically when calibrated with data extracted from real world scenarios. To this end, an ACGI tracking algorithm incorporating geometric constraints can extract kinematic data from video. Such an algorithm can track a number of significant data points with a great degree of automation and efficiency. Traditional methods of video data extraction have proven tedious and time-consuming due to extensive user input requirements. This characteristic limits the amount of data that can be processed in a given amount of time. With this in mind, the ACGI algorithm functions with a minimal degree of user involvement. Initial efforts have been aimed at analyzing catastrophic pole-vaulting injuries, with the end goal of prevention. Points identified at the outset of a video sequence, and within a small subset of frames spaced throughout, can be identified automatically within every frame, and, thus, tracked regardless of their immediately local regions having undergone translational, rotational, or deformational motion. This is an improvement over more traditional motion estimation techniques, such as block-based methods, which are often incapable of detecting complex non-translational motion. Furthermore, the incorporation of geometric constraints into the algorithm allows successful tracking under conditions problematic for any motion model.

Human experiments that study the biomechanical actions leading to dangerous situations are difficult to perform given the inherent danger to the participants. Therefore, motion analysis of existing data capturing such occurrences is valuable. Video footage of subjects in motion is an excellent starting point for an accurate dynamics analysis of an activity. However, a significant amount of data processing typically must be carried out before information acquired with a video camera can be effectively used.

In some embodiments, kinematic data is extracted from video footage of an athlete, such as, for example, footage from a pole vaulter. There is a great deal of information contained in a video sequence of even a few seconds, the majority of which is inconsequential from a dynamics analysis standpoint. In this case, the specific aim of processing the vaulter video segments is to track the motion of specific points throughout the course of the vault. By tracking the progress of certain points it is possible to extract valuable kinematic information. Among the tracked points are, for example, the head, shoulders, elbows, hands, hips, knees, and feet. Once the motion of these points through the frame of reference has been determined, all irrelevant data can be discarded, leaving a useful spatio-temporally segmented data set.

There are considerable obstacles in developing an algorithm that is able to automatically track the movement of the aforementioned points through the course of a vault. A constant frame of reference simplifies the situation by eliminating panning and zooming effects, but the most severe difficulties still remain. It may be easy for a human observer to look at two similar images and identify an athlete's shoulder, but for a computer this process is far from trivial. In order to understand how this problem is addressed one should be aware of the characteristics of an image that a computer is able to evaluate on the most basic levels. Pixel intensity and location are two important quantifiable characteristics of an image in terms of a computer's ability to identify a structure. These basic quantities often change.

As an athlete progresses through the vault, his or her reference points will be located at different places in each individual image frame. The shape and size of the region to be tracked changes as well. Tracking these reference points through the video sequence typically requires an algorithm that is able to account for all factors contributing to the differing appearance of a single region from one frame to the next. In addition, the algorithm often must avoid excessive computation and user input in order to efficiently process large amounts of data.

An embodiment of the motion-tracking algorithm is implemented as follows. First, a user views the opening scene of a vaulting sequence. The user then selects points within the scene to be tracked. Next, the user identifies the approximate locations of those points in a specified subset of frames spaced evenly throughout the video sequence. This spacing is usually determined pragmatically; if results are poor, shorter temporal intervals between user identifications are required. Using the approximate identification of points in later frames as the center of a local search region, ACGI matches the originally identified points to the best corresponding locations in subsequent frames. Central anchors for search regions in frames unexamined by the user are determined via linear interpolation between the previously determined locations of points in the original frame and the frames examined later. Exact point locations within those search regions are then identified via geometrically constrained ACGI.

Although ACGI is the primary tracking mechanism, additional information is incorporated to improve tracking. Geometric constraints are imposed upon the tracked points to ensure that fixed distances, such as those between feet and knees, remain consistent. These measures can change over the course of an entire sequence because of out-of-plane motion, but locally are well approximated as constant. In occlusion instances, ACGI, or any other motion model, will be incapable of tracking a point that is hidden from the camera. Cases such as this may lead to violations of the aforementioned geometric constraints, in which case the point location provided by the ACGI algorithm is replaced by a linear interpolation between the two closest surrounding geometrically satisfactory solutions.

Ultimately, for many instances, only a small subset of frames from a video sequence need be examined by the user in order to perform tracking. In addition, user error introduced in examination of the later frames is reduced by the tracking algorithm. The end result is a more accurately spatio-temporally segmented data set, acquired in less time than with traditional means The end product from video of an athlete performing a vault is a data set describing the motion of specific points in both a spatial and a temporal sense. This information can be used to create dynamic motion models of the vaulter for further analysis.

The ACGI methodology is also suitable for addressing a variety of other reconstruction problems. The use of ACGI for the reconstruction of rare and complex vascular morphologies is also valuable. Other currently used reconstruction programs are capable of reproducing three-dimensional models, but often suffer because of poor resolution and artifacts.

Reconstruction rendered with the ACGI methodology displays high resolution while maintaining physiologic consistency. These factors result in a superior reconstruction. Furthermore the added manipulability of the ACGI reconstruction offers the clinician greater latitude in visualizing characteristics of the complex anatomy that are not apparent from a static visualization.

ACGI is equally well suited to reconstruct other organs and structures of interest from MR images. In a study investigating catastrophic head injury, ACGI was used to reconstruct cerebral morphologies from sparse sets of MR images. The effects of undersampling remain detectable, but, in comparison to the sparse original data set, the reconstruction is a vast improvement and of higher quality than was achieved with other means. The incorporation of additional interpolated frames results in the higher resolution characteristic of this reconstruction. The ability of ACGI to reconstruct well even from sparsely acquired data sets makes it a valuable tool for visualization and quantification.

In summary, ACGI has shown its value in addressing a variety of reconstruction problems and has performed well in various applications. Given its success in other reconstruction scenarios, it is evident that ACGI is adept at reconstructing virtually any anatomical structure imaged with MR, and is likely to perform well in reconstructing any structure, biological or otherwise, sampled with a planar imaging modality.

There are a variety of additional applications for the ACGI methodology.

The disclosed technique provides a solution for other medical applications that demand the reconstruction of velocity data acquired from conscious adult patients, as the aforementioned breath hold scans can supply the contiguous velocity images required as input. Fortunately once dense contiguous velocity data sets are obtainable from pediatric patients, the need for separate morphological images will no longer exist. The modulus images acquired as part of the velocity scan will serve as the input for the morphological reconstruction phase. Additionally the segmentations for these images can be applied to both the modulus and individual phase encoded velocity images, so segmentation need only be executed a single time Extending optical flow to apply to MR data varying in space rather than time is a new concept. This extension is appropriate as the anatomical changes observed in contiguously acquired MR images are subtle enough to resemble a structure changing over time. Integrating the ACGI methodology into this framework offers increased performance as the important characteristics of optical flow are retained while efficiency is increased. Motion estimation, in general, has been previously applied to problems that are similar to this one from a mathematical standpoint, but has not been applied to the reconstruction of vascular morphologies from MR data.

The application of the ACGI methodology to three-dimensional velocity field reconstruction is especially interesting. Because of the order in which the proposed algorithm performs individual tasks, specifically reconstruction prior to segmentation, a solution to the velocity problem is made possible. Alternative techniques for reconstruction in the morphological scenario are simply not applicable to the velocity case as the significant information to be reconstructed resides in entire planes of data, not just the linear borders of regions that are retained with such techniques. For this reason the ACGI reconstruction of three-dimensional velocity fields offers a solution to a problem that has previously gone unsolved.

An application demanding robust tracking of significant points is present in the analysis of prosthetic heart valve performance. Valves are marked with small dots that occupy a fixed position on the moving valve leaflet. Stress and strain values can be derived by examining the displacement of markers on the leaflet over the course of a heart cycle. These data are important as they offer insight into the relative success or failure that a particular prosthetic valve is likely to experience over time.

First, a user views the opening scene of a heart valve video sequence. The user then selects points within the scene to be tracked. The user then identifies the approximate locations of those points in a specified subset of frames spaced evenly throughout the video sequence. Using the approximate identification of points in subsequent frames as the center of a local search region, ACGI matches the originally identified points to the best corresponding matches in the later frames. Central anchors for search regions in frames unexamined by the user are determined via linear interpolation between the previously determined locations of points in the original frame and the later examined frames. Exact point locations within those search regions are then identified via ACGI.

As in previous applications, tracking can be carried out with minimal user input. This is especially significant in the context of the heart valve-tracking scenario, as the video input stream is acquired with a high-speed frame grabber, and there are a great number of frames to be processed. Data analysis in this context was previously limited by the time required for a user to process each sequence. Since various results of heart valve tracking are shown in the cross-referenced provisional applications and, also, in the Frakes thesis, those results are not discussed further here. However, it should be noted that those results demonstrated the advantageous performance of ACGI in heart valve tracking.

From a motion estimation standpoint, several factors complicate the military target-tracking scenario as opposed to the previously described tracking scenarios. Specifically these complicating factors include that the tracking algorithm must be insensitive to noise and must operate in a particularly efficient manner given the real time demands of military target tracking applications. As before, the algorithm must be able to detect and to describe complex non-translational motion. Each of these salient factors is addressed in the ACGI implementation.

The ability to handle complex non-translational motion is limited to a subset of motion estimation strategies. This ability is paramount in the context of target tracking as target motion is not limited to the simple translational case. Optical flow-based solutions are known to characterize this type of motion well. Conversely, block-based motion models are not. Modified block-based models incorporating higher order motion models can characterize such motion, but typically require a great deal of computation. The motion estimation solution proposed here combines block-based and optical flow-based motion estimation in the ACGI framework. This motion model is able to characterize complex motion like pure optical flow solutions, but retains the simplicity of the block-based methodology.

Any successful target tracking strategy should also be robust in terms of handling noise. Since no sensor is ideal, image sequences from real world scenarios are guaranteed to contain some level of noise. To address this problem, the methodology proposed here reduces effects of noise in video by filtering image sequences prior to motion estimation. Traditional methods of noise removal usually involve spatial filtering alone. A spatio-temporal filtering scheme incorporated into this algorithm is able to remove more of the effects of noise than spatial filtering alone. This approach allows more accurate motion estimation to be achieved, as the image sequence is of higher quality prior to motion estimation. In addition the algorithm is better suited to handle noise than traditional optical flow implementations because it relies on the minimization of error associated with the optical flow equation rather than an explicit solution to the equation.

Target tracking often requires real time processing so that results may be used in existing applications that demand immediate action based on tracked data. Accordingly, motion estimation solutions operating on larger time scales are not useful. Optical flow-based solutions typically fall into this category, as intense computation is typically required to resolve motion vectors with optical flow. Block-based motion models are far simpler in terms of computation. By coupling optical flow with a block-based model, an efficient solution is created that allows the determination of complex motion fields without the computational complexity that typically accompanies other motion solutions capable of generating similar results.

The specific implementation of the target-tracking algorithm is similar to the framework that has been presented for the previously discussed tracking applications. Periodic target registration is used in conjunction with motion estimation to monitor the progress of the target throughout the duration of a video sequence. In this way registration and motion estimation compliment each other, as two predictions of target location are available and can be intelligently combined so that the more accurate measure for a given instant is selected.

The smooth transformation of one image into another is referred to as image morphing. This effect is commonly employed in applications for movies and television. Two operations are typically required to perform image morphing: warping and cross fading. Warping allows similar features in two different images to be aligned, while cross fading is used to create intermediate images between the two. For the transition to appear smooth and continuous, usually, similar features must exist in the image pair to be morphed. Applications requiring image morphing have traditionally required that an animator manually establish correlations between features in different frames. An alternative to this methodology is to use motion estimation to establish these correspondences automatically.

Traditional image warping algorithms can be classified into two general classes: mesh warping or feature-based warping. Original efforts to perform mesh warping required only point correspondences to perform the operation. Since only these point correlations were used to actuate the image transition, multiple attempts were often required to obtain satisfactory results along continuous edges. As a result the overall process proved cumbersome. More recently feature-based methodologies have been explored for image warping. This technique allows correlations to be established between entire features, such as curves, in the different images. Additional computational complexity and the creation of unexpected features in interpolated frames typically hinder this approach.

Using motion estimation via ACGI to establish correlations between images for morphing offers an attractive alternative to traditional approaches. The ACGI approach ensures the correspondence of entire similar features in respective images and does so with a reasonable degree of computational complexity. The result is an algorithm that eliminates the tedious nature of manual mappings.

As provided above, data reconstruction is an important issue in a variety of applications. Other examples include sequential two-dimensional (2D) video frames, which are often acquired over a fixed time interval at a given time-resolution. Since the difference between two sequential video frames represents motion of objects in the video frames, the time-dimension of the video frames can be portrayed as the third dimension, and the time-series of video frames can be portrayed as a 3D image.

The block-based motion estimation algorithm, the optical-flow-based motion estimation algorithm, the control grid interpolation (CGI) algorithm, and the adaptive control grid interpolation (ACGI) algorithm, as discussed above, may be implemented in hardware, software, firmware, or a combination thereof. In the preferred embodiment(s), these algorithms are implemented in software or firmware that is stored in a memory and that is executed by a suitable instruction execution system. If implemented in hardware, as in an alternative embodiment, these algorithms can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The various algorithms, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the invention as described may be made. For example, different optimization techniques could be used in determining motion parameters via optical flow, block matching, CGI, or ACGI. Also, different weighting coefficients could be used in calculating weighted sums; different termination criteria could be used in motion parameter calculation; alternative data perspectives could be used for interpolation; different segmentation strategies could be used in conjunction with directional interpolation; different error measures could be used in determining motion vectors; different data sources could be interpolated, etc. All such changes, modifications, and alterations should therefore be seen as within the scope of the disclosure.

What is claimed is:

1. A data reconstruction method, comprising the steps of:
   accessing a three-dimensional (3D) data set, the 3D data set comprising two-dimensional (2D) velocity images; and
   directionally interpolating, by a computer, between the 2D velocity images to generate a 2D intermediate velocity image, wherein the step of directionally interpolating comprises the step of determining a motion field based on divergence information associated with the 2D intermediate velocity image.

2. The method of claim 1, wherein the step of interpolating between the 2D velocity images further comprises the step of executing a block-based motion estimation algorithm on the 2D velocity images.

3. The method of claim 1, wherein the step of interpolating between the 2D velocity images further comprises the step of executing an optical flow-based motion estimation algorithm on the 2D velocity images.

4. The method of claim 1, wherein the step of interpolating between the 2D velocity images further comprises the step of executing a control grid interpolation (CGI) algorithm on the 2D velocity images.

5. The method of claim 1, wherein the step of interpolating between the 2D velocity images further comprises the step of executing an adaptive control grid interpolation (ACGI) algorithm on the 2D velocity images.

6. A non-transitory computer-readable medium having code for reconstructing three-dimensional (3D) data, the 3D data comprising two-dimensional (2D) velocity images, the non-transitory computer-readable medium comprising:
   computer-readable code adapted to access a three-dimensional (3D) data set, the 3D data set comprising 2D velocity images;
   computer-readable code adapted to directionally interpolate between the 2D velocity images to generate a 2D intermediate image; and
   computer-readable code adapted to determine a motion field based on divergence information associated with the 2D intermediate image.

7. The non-transitory computer-readable medium of claim 6, further comprising computer-readable code adapted to execute a block-based motion estimation algorithm on the 2D velocity images.

8. The non-transitory computer-readable medium of claim 6, further comprising computer-readable code adapted to execute an optical flow-based motion estimation algorithm on the 2D velocity images.

9. The non-transitory computer-readable medium of claim 6, further comprising computer-readable code adapted to execute a control grid interpolation (CGI) algorithm on the 2D velocity images.

10. The non-transitory computer-readable medium of claim 6, further comprising computer-readable code adapted to execute an adaptive control grid interpolation (ACGI) algorithm on the 2D velocity images.

* * * * *